(12) United States Patent
Weare et al.

(10) Patent No.: US 6,657,117 B2
(45) Date of Patent: Dec. 2, 2003

(54) SYSTEM AND METHODS FOR PROVIDING AUTOMATIC CLASSIFICATION OF MEDIA ENTITIES ACCORDING TO TEMPO PROPERTIES

(75) Inventors: Christopher B. Weare, Bellevue, WA (US); Marc Daskalovic, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 27 days.

(21) Appl. No.: 09/905,345

(22) Filed: Jul. 13, 2001

(65) Prior Publication Data

US 2002/0037083 A1 Mar. 28, 2002

Related U.S. Application Data

(60) Provisional application No. 60/218,289, filed on Jul. 14, 2000.

(51) Int. Cl.[7] .............................. G10H 1/40; G10H 5/00
(52) U.S. Cl. ............................. 84/668; 84/609; 84/612
(58) Field of Search ................... 84/600–606, 609–612, 84/615–618, 634–636, 649–656, 666–668

(56) References Cited

U.S. PATENT DOCUMENTS

| | | | | |
|---|---|---|---|---|
| 5,895,876 A | * | 4/1999 | Moriyama et al. | 84/609 |
| 5,918,223 A | | 6/1999 | Blum et al. | 707/1 |
| 6,175,072 B1 | * | 1/2001 | Aoki | 84/636 |
| 6,201,176 B1 | * | 3/2001 | Yourlo | 84/609 |
| 6,323,412 B1 | * | 11/2001 | Loo | 84/636 |
| 6,376,758 B1 | * | 4/2002 | Yamada et al. | 84/612 |
| 6,441,291 B2 | * | 8/2002 | Hasegawa et al. | 84/609 |

OTHER PUBLICATIONS

Chen, A.L.P. et al., "Query by music segments: an Efficient Approach for Song Retrieval," *Proceedings of International Conference on Multimedia and Expo.*, New York, NY, Jul. 30–Aug. 2, 2000, 2, 873–876.

Chen, J.C.C. et al., "Query by Rhythm: an Approach for Song Retrieval," *Proceedings Eighth International Workshop on Research Issues in Data Engineering. Continuous–Media Databases and Applications*, Orlando, Florida, Feb. 23–24, 1998, 139–146.

Davies, S.C. et al., "An Adaptive Technique for Automated Recognition of Musical Tones," *Conference Record of the Thirtieth Asilomer Conference on Signals, Systems, and Computers*, Pacific Grove, California, Nov. 3–6, 1996, 2, 1138–1141.

(List continued on next page.)

*Primary Examiner*—Marlon T. Fletcher
(74) *Attorney, Agent, or Firm*—Woodcock Washburn LLP

(57) ABSTRACT

In connection with a classification system for classifying media entities that merges perceptual classification techniques and digital signal processing classification techniques for improved classification of media entities, a system and methods are provided for automatically classifying and characterizing tempo properties of media entities. Such a system and methods may be useful for the indexing of a database or other storage collection of media entities, such as media entities that are audio files, or have portions that are audio files. The methods also help to determine media entities that have similar, or dissimilar as a request may indicate, tempo(s) by utilizing classification chain techniques that test distances between media entities in terms of their properties. For example, a neighborhood of songs may be determined within which each song has similar tempo characteristics.

35 Claims, 15 Drawing Sheets

OTHER PUBLICATIONS

Francu, C. et al., "Distance Metrics and Indexing Strategies for a Digital Library of Popular Music," *Proceedings of International Conference on Multimedia and Expo.,* New York, NY, Jul. 30–Aug. 2, 2000, 2, 889–892.

Goldberg, I. et al., "The Ninja Jukebox," *2nd USENIX Symposium on Internet Technologies and Systems,* Boulder, Colorado, Oct. 11–14, 1999, 37–46.

Hoffbeck, J.P., "A Method for Hiding Useful Information in Digital Audio Signals," *Computers in Education J.,* 2001, 11(1), 7–11.

Logan, B. et al., "Music Summarization Using Key Phrases," *Proceedings of 2000 International Conference on Acoustics, Speech and Signal Processing,* Istanbul, Turkey, Jun. 5–9, 2000, 2, 749–752.

McNab, R.J., et al., "Towards the Digital Music Library: Tune Retrieval from Acoustic Input," *Proceedings of the 1st ACM International Conference on Digital Libraries,* Bethesda, Maryland, Mar. 1996, 11–18.

McNab, R.J. et al., "Tune Retrieval in the Multimedia Library," *Multimedia Tools and Applications,* 2000, 10(2–3), 113–132.

McNab, R.J. et al., "The New Zealand Digital Library MELody inDEX," *D–Lib Magazine,* 1997, http://www.dlib.org/dlib/may97/meldex/05witten.html, 8 pages.

Ozimek, E. et al., "Thresholds of Perception of Irregular Signal Frequency Changes," *Archives of Acoustics,* 1985, 10(2), 123–141.

Rabson, G. et al., "The National Tune Index: a Systems Overview," *Computers and the Humanities,* 1981, 15(3), 129–137.

Scludermann, B., "Quantity versus quality. II. Setting up a database for a quantitative analysis of German/Dutch language mixtures in late medieval song MSs," *Proceedings of the 5th International Conference and Exhibition on Multi–Lingual Computing,* Cambridge, UK, Apr. 11–13, 1996, 7/6/1–11.

Sonoda, T. et al., "A WWW–based Melody Retrieval System," *1998 International Computer Music Conference,* Oct., 1988, 349–352.

Spyridis, H. et al., "Fourier Analysis and Information Theory on a Musical Composition," *Acustica,* 1983, 52(4), 255–262.

Tang, M. et al., "Selection of Melody Lines for Music Databases," *Proceedings 24th Annual International Computer Software and Applications Conference,* Taipei, Taiwan, Oct. 25–27, 2000, 243–248.

Umemoto, T. et al., "Construction of Transcription System and Comparison of Peak Extraction Methods," *Trans. Of the Soc. Of Instrument and Control Engineers,* 1993, 29(10), 1227–1231 (English language abstract included).

Yang, C.Y. et al., "Korean Folk Song Retrieval Using Rhythm Pattern Classification," *Proceedings of Fifth International Symposium on Signal Processing and its Applications,* Brisbane, Australia, Aug. 22–25, 1999, 1, 123–126.

* cited by examiner distance of nearest neighbor for each of EV1, EV2 and EV3

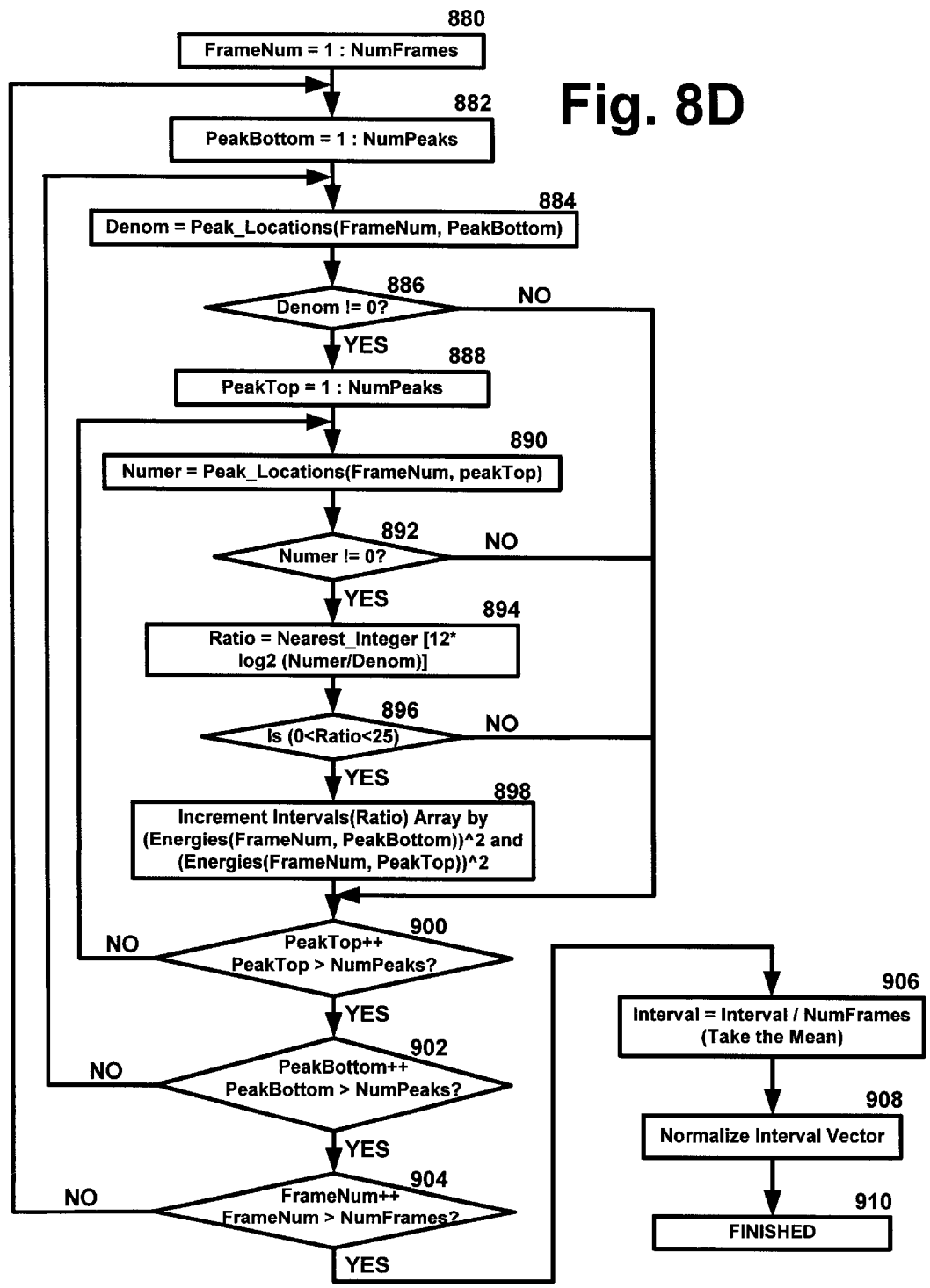

SYSTEM AND METHODS FOR PROVIDING AUTOMATIC CLASSIFICATION OF MEDIA ENTITIES ACCORDING TO TEMPO PROPERTIES

CROSS REFERENCE TO RELATED APPLICATIONS

This application claims priority to U.S. Provisional Application Ser. No. 60/218,289, filed Jul. 14, 2000. This application relates to U.S. patent application Nos. 09/900,230, filed Jul. 6, 2001; 09/899,490 filed Jul. 5, 2001, now U.S. Pat. No. 6,545,209 issued Apr. 8, 2003; 09/934,071 filed Aug. 20, 2001; 09/900,059 filed Jul. 6, 2001; 09/934,774 filed Aug. 21, 2001; 09/935,349 filed Aug. 21, 2001; 09/904,465 filed Jul. 31, 2001; 09/905,011 filed Jul. 31, 2001; 09/942,509 filed Aug. 29, 2001; and 09/928,004 filed Aug. 10, 2001.

FIELD OF THE INVENTION

The present invention relates to a system and methods for providing automatic classification of media entities according to tempo properties. More particularly, the present invention relates to a system and methods for automatically classifying media entities according to perceptual tempo properties and tempo properties determined by digital signal processing techniques.

BACKGROUND OF THE INVENTION

Classifying information that has subjectively perceived attributes or characteristics is difficult. When the information is one or more musical compositions, classification is complicated by the widely varying subjective perceptions of the musical compositions by different listeners. One listener may perceive a particular musical composition as "hauntingly beautiful" whereas another may perceive the same composition as "annoyingly twangy."

In the classical music context, musicologists have developed names for various attributes of musical compositions. Terms such as adagio, fortissimo, or allegro broadly describe the strength with which instruments in an orchestra should be played to properly render a musical composition from sheet music. In the popular music context, there is less agreement upon proper terminology. Composers indicate how to render their musical compositions with annotations such as brightly, softly, etc., but there is no consistent, concise, agreed-upon system for such annotations.

As a result of rapid movement of musical recordings from sheet music to pre-recorded analog media to digital storage and retrieval technologies, this problem has become acute. In particular, as large libraries of digital musical recordings have become available through global computer networks, a need has developed to classify individual musical compositions in a quantitative manner based on highly subjective features, in order to facilitate rapid search and retrieval of large collections of compositions.

Musical compositions and other information are now widely available for sampling and purchase over global computer networks through online merchants such as AMAZON.COM®, BARNESANDNOBLE.COM®, CDNOW.COM®, etc. A prospective consumer can use a computer system equipped with a standard Web browser to contact an online merchant, browse an online catalog of pre-recorded music, select a song or collection of songs ("album"), and purchase the song or album for shipment direct to the consumer. In this context, online merchants and others desire to assist the consumer in making a purchase selection and desire to suggest possible selections for purchase. However, current classification systems and search and retrieval systems are inadequate for these tasks.

A variety of inadequate classification and search approaches are now used. In one approach, a consumer selects a musical composition for listening or for purchase based on past positive experience with the same artist or with similar music. This approach has a significant disadvantage in that it involves guessing because the consumer has no familiarity with the musical composition that is selected.

In another approach, a merchant classifies musical compositions into broad categories or genres. The disadvantage of this approach is that typically the genres are too broad. For example, a wide variety of qualitatively different albums and songs may be classified in the genre of "Popular Music" or "Rock and Roll."

In still another approach, an online merchant presents a search page to a client associated with the consumer. The merchant receives selection criteria from the client for use in searching the merchant's catalog or database of available music. Normally the selection criteria are limited to song name, album title, or artist name. The merchant searches the database based on the selection criteria and returns a list of matching results to the client. The client selects one item in the list and receives further, detailed information about that item. The merchant also creates and returns one or more critics' reviews, customer reviews, or past purchase information associated with the item.

For example, the merchant may present a review by a music critic of a magazine that critiques the album selected by the client. The merchant may also present informal reviews of the album that have been previously entered into the system by other consumers. Further, the merchant may present suggestions of related music based on prior purchases of others. For example, in the approach of AMAZON.COM®, when a client requests detailed information about a particular album or song, the system displays information stating, "People who bought this album also bought . . . " followed by a list of other albums or songs. The list of other albums or songs is derived from actual purchase experience of the system. This is called "collaborative filtering."

However, this approach has a significant disadvantage, namely that the suggested albums or songs are based on extrinsic similarity as indicated by purchase decisions of others, rather than based upon objective similarity of intrinsic attributes of a requested album or song and the suggested albums or songs. A decision by another consumer to purchase two albums at the same time does not indicate that the two albums are objectively similar or even that the consumer liked both. For example, the consumer might have bought one for the consumer and the second for a third party having greatly differing subjective taste than the consumer. As a result, some pundits have termed the prior approach as the "greater fools" approach because it relies on the judgment of others.

Another disadvantage of collaborative filtering is that output data is normally available only for complete albums and not for individual songs. Thus, a first album that the consumer likes may be broadly similar to second album, but the second album may contain individual songs that are strikingly dissimilar from the first album, and the consumer has no way to detect or act on such dissimilarity.

Still another disadvantage of collaborative filtering is that it requires a large mass of historical data in order to provide useful search results. The search results indicating what others bought are only useful after a large number of transactions, so that meaningful patterns and meaningful similarity emerge. Moreover, early transactions tend to over-influence later buyers, and popular titles tend to self-perpetuate.

In a related approach, the merchant may present information describing a song or an album that is prepared and distributed by the recording artist, a record label, or other entities that are commercially associated with the recording. A disadvantage of this information is that it may be biased, it may deliberately mischaracterize the recording in the hope of increasing its sales, and it is normally based on inconsistent terms and meanings.

In still another approach, digital signal processing (DSP) analysis is used to try to match characteristics from song to song, but DSP analysis alone has proven to be insufficient for classification purposes.

U.S. Pat. No. 5,918,223, assigned to Muscle Fish, a corporation of Berkeley, Calif. (hereinafter the Muscle Fish Patent), describes one such DSP analysis technique. The Muscle Fish Patent describes a system having two basic components, typically implemented as software running on a digital computer. The two components are the analysis of sounds (digital audio data), and the retrieval of these sounds based upon statistical or frame-by-frame comparisons of the analysis results. In that system, the process first measures a variety of acoustical features of each sound file and the choice of which acoustical features to measure is critical to the success of the process. Loudness, bass, pitch, brightness, bandwidth, and Mel-frequency cepstral coefficients (MFCCs) at periodic intervals (referred to as "frames") over the length of the sound file are measured. The per-frame values are optionally stored, for applications that require that level of detail. Next, the per-frame first derivative of each of these features is computed. Specific statistical measurements, namely, the mean and standard deviation, of each of these features, including the first derivatives, are computed to describe their variation over time. This set of statistical measurements is represented as an N-vector (a vector with N elements), referred to as the rhythm feature vector for music.

Once the feature vector of the sound file has been stored in a database with a corresponding link to the original data file, the user can query the database in order to access the corresponding sound files. The database system must be able to measure the distance in N-space between two N-vectors.

Users are allowed to search the sound file database by four specific methods, enumerated below. The result of these searches is a list of sound files rank-ordered by distance from the specified N-vector, which corresponds to sound files that are most similar to the specified N-vector or average N-vector of a user grouping of songs.

1) Simile: The user may ask for sounds that are similar to an example sound file, or a list of example sound files.
2) Acoustical/perceptual features: The user may ask for sounds in terms of commonly understood physical characteristics, such as brightness, pitch and loudness.
3) Subjective features: The user may ask for sounds using individually defined classes. For example, a user might be looking for a sound that is both "shimmering" and "rough," where the classes "shimmering" and "rough" have been previously defined by a grouping. The user can thus create classes of sounds (e.g. "bird sounds", "rock music", etc.) by specifying a set of sound files that belong to this class. The average N-vector of these sound files will represent this sound class in N-space for purposes of searching. However, this requires ex post facto user grouping of songs that the user thinks are similar.
4) Onomatopoeia: producing a sound similar in some quality to the sound you are looking for. For example, the user could produce a buzzing sound into a microphone in order to find sounds like bees or electrical hum.

While DSP analysis may be effective for some groups or classes of songs, it is ineffective for others, and there has so far been no technique for determining what makes the technique effective for some music and not others. Specifically, such acoustical analysis as has been implemented thus far suffers defects because 1) the effectiveness of the analysis is being questioned regarding the accuracy of the results, thus diminishing the perceived quality by the user and 2) recommendations can only be made if the user manually types in a desired artist or song title, or group of songs from that specific website. Accordingly, DSP analysis, by itself, is unreliable and thus insufficient for widespread commercial or other use.

Methods, such as those used by the Muscle Fish patent, which use purely signal processing to determine similarities thus have problems. Another problem with the Muscle Fish approach is that it ignores the observed fact that often times, sounds with similar attributes as calculated by a digital signal processing algorithm will be perceived as sounding very different. This is because, at present, no previously available digital signal processing approach can match the ability of the human brain for extracting salient information from a stream of data. As a result, all previous attempts at signal classification using digital signal processing techniques miss important aspects of a signal that the brain uses for determining similarity.

Previous attempts for classification based on connectionist approaches, such as artificial neural networks (ANN), and self organizing feature maps (SOFM) have had only limited success classifying sounds based on similarity. This has to do with the difficulties in training ANN's and SOFM's. The amount of computing resources required to train ANN's and SOFM of the required complexity are cost and resource prohibitive.

Accordingly, there is a need for an improved method of classifying information that is characterized by the convergence of subjective or perceptual analysis and DSP acoustical analysis criteria to improve the overall classification efficacy and ease with which music may be retrieved. With such a classification technique, it would be desirable to provide a classification chain, initially formed from a threshold number of training media entities and fine-tuned over time, from which further new media entities may be classified, from which music matching may be performed, from which playlists may be generated, from which classification rules may be generated, etc.

More particularly, there is a need for a classification chain that overcomes the limitations of the art by in part using humans to create a map that allows one to uncover relationships between various points in the attribute space. In essence, it would be desirable to utilize human experts to show a classification chain how two points in attribute space, where the attributes are determined by a signal processing algorithm, relate in perception-space. For instance, two points might be very close in attribute space, but quite distant in perception space, and thus a proper solution considers and solves this problem in a cost effective manner. In a system that classifies information that is characterized by the convergence of subjective or perceptual analysis and DSP acoustical analysis, it would be still further desirable to provide a system that automatically classifies media entities according to tempo properties of at least one portion of an audio file represented by the media entities.

SUMMARY OF THE INVENTION

In connection with a classification system for classifying media entities that merges perceptual classification techniques and digital signal processing classification techniques for improved classification of media entities, the present invention provides a system and methods for automatically classifying and characterizing tempo properties of media entities. Such a system and methods may be useful for the indexing of a database or other storage collection of media entities, such as media entities that are audio files, or have portions that are audio files. The methods also help to determine media entities that have similar, or dissimilar as a request may indicate, tempo(s) by utilizing classification chain techniques that test distances between media entities in terms of their properties. For example, a neighborhood of songs may be determined within which each song has similar tempo characteristics.

Other features of the present invention are described below.

BRIEF DESCRIPTION OF THE DRAWINGS

The system and methods for providing automatic classification of media entities according to tempo properties are further described with reference to the accompanying drawings in which:

FIG. 8D illustrates an exemplary peak intervals calculation phase for a musical consonance calculation in accordance with the present invention;

DETAILED DESCRIPTION OF PREFERRED EMBODIMENTS

Overview

Figure 1:
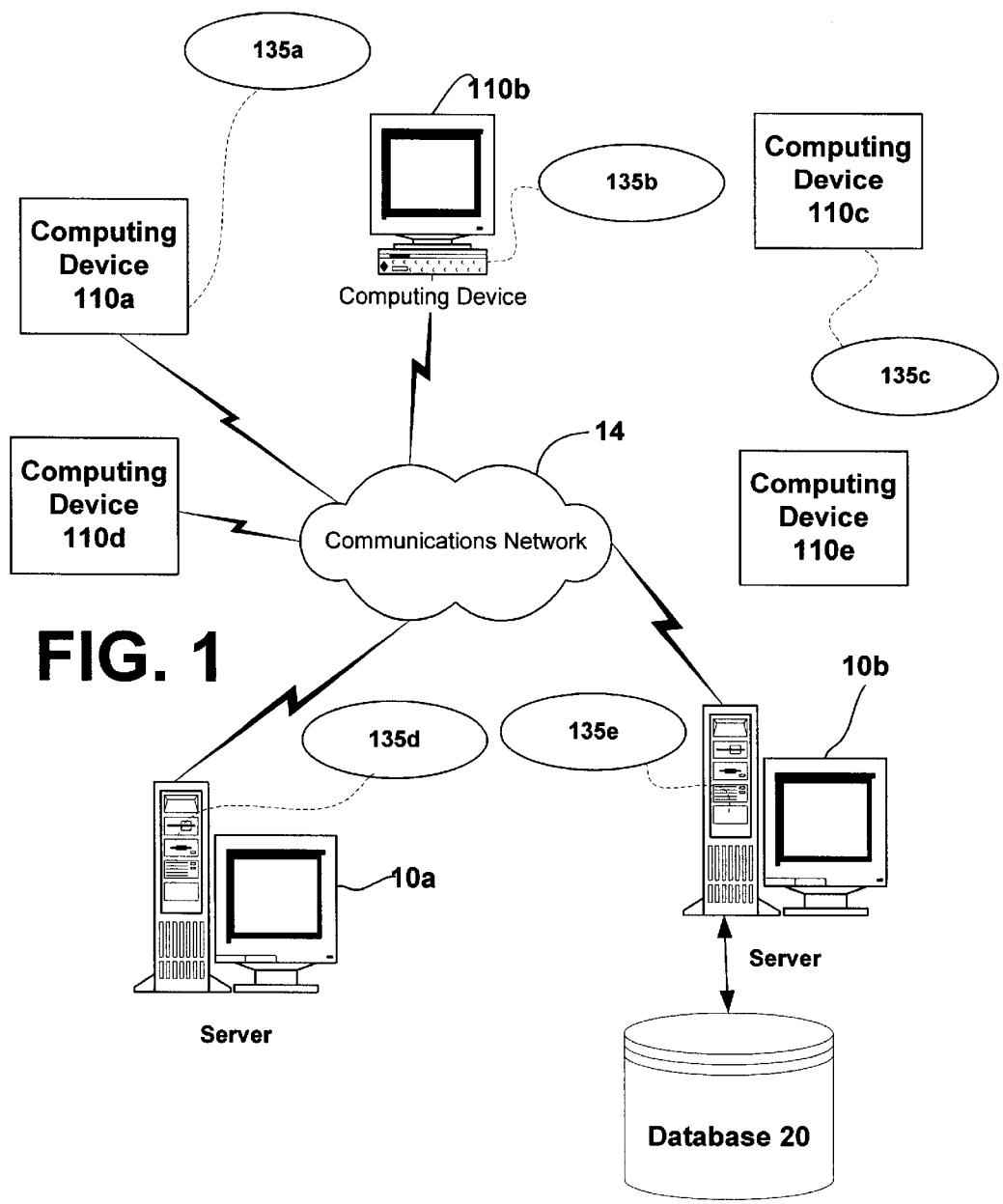
FIG. 1 is a block diagram representing an exemplary network environment in which the present invention may be implemented.

With respect to a classification system for classifying media entities that merges perceptual classification techniques and digital signal processing classification techniques, the present invention provides a system and methods for automatically classifying and characterizing tempo properties of media entities. Tempo may be described as the rate of motion or activity, or as the rate of speed of a musical piece or passage indicated by one of a series of directions e.g., largo, presto, or allegro.

Such a method and system may be useful in the indexing of a database or other storage collection of media entities, such as audio files, or portions of audio files. The methods also help to determine songs that have similar, or dissimilar as a request may indicate, sonic properties by utilizing classification chain techniques that test distances between media entities in terms of their properties. For example, a neighborhood of songs may be determined within which each song has similar sonic properties.

In exemplary embodiments, the invention includes decimating an input signal to a fixed sampling rate, such as a 43 Hz sampling rate. Then, the tempo characteristics of the resulting envelope of data are exaggerated and accentuated, while also smoothing the envelope to remove biases and trends. This may include performing a first order difference calculation followed by performing half wave rectification and applying a median filter to smooth out the aberrations, biases and/or trends. Then, after the mean value is subtracted, the data may be half wave rectified again. Then, another first order difference calculation may be performed, followed again by half wave rectification. The resulting waveform from the above processing is used to generate the final data that may be input, for example, to a classification chain. The final data consists of 130 values or "bins" reflective of the different correlation strengths at different time periods or frequencies. The final data is generated by looping through the decimated waveform and accumulating the base two logarithm of the product of pairs of points located at a fixed offset from each other. This is done 130 times for offsets spanning from 1 to 130 samples. The 130 values of the final data may then be input to a classification chain.

Operation of the classification chain may include two phases: classification and operation. Human experts undertake the classification phase to provide initial perceptually observed spectral classification data to the classification chain. These experts assign each entry in the data set, to one or more spectral classes, corresponding to some relevant perceptual spectral or sonic properties of the data. The classified data is then used to construct the initial classification chain. Once an initial classification chain is formed, the operation of the classification chain may be observed by human experts, and further trained for improved performance. Once the classification chain is ready for operation, it may be used to classify or otherwise relate songs according to their sonic properties.

Exemplary Computer and Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data and an appropriate playlist generation engine.

FIG. 1 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 10a, 10b, 10c, 10d, 10e, etc., such as a portable computer, handheld computer, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 in accordance with the present invention, such as a database 20 for storing classification information, music and/or software incident thereto. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and database(s) 20.

Classification

In accordance with one aspect of the present invention, a unique classification technique is implemented which combines human and machine classification techniques in a convergent manner, from which a classification chain, which embodies a canonical set of rules for classifying music, may be developed, and from which a database, or other storage element, may be filled with the classification chain and/or classified songs. With such techniques and rules, radio stations, studios and/or anyone else with an interest in classifying music will be enabled to classify new music. With such a database, music association may be implemented in real time, so that playlists or lists of related (or unrelated if the case requires) media entities may be generated. Playlists may be generated, for example, from a single song and/or a user preference profile in accordance with an appropriate analysis and matching algorithm performed on the data store of the database. Nearest neighbor and/or other matching algorithms may be utilized to locate songs that are similar to the single song and/or are suited to the user profile. Based upon a distance measurement from the mean, median, etc. of a certain class in the classification chain, a confidence level for song classification may also be returned.

Figure 2:
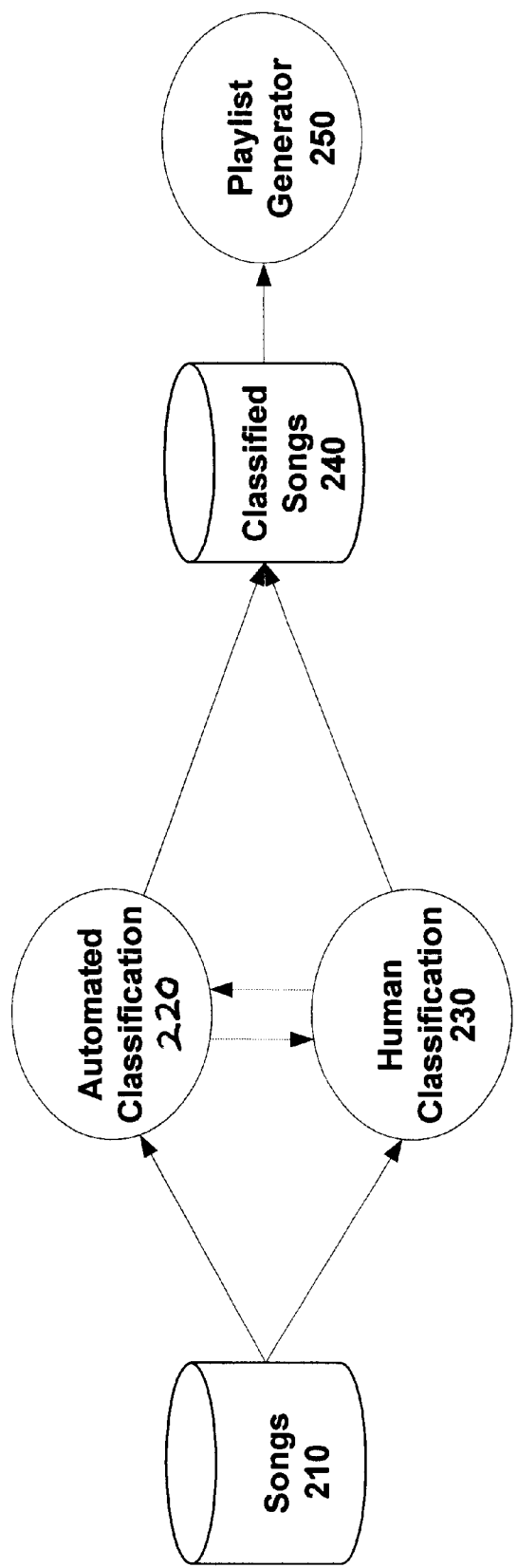
FIG. 2 is a high level block diagram representing the media content classification system utilized to classify media, such as music, in accordance with the present invention.

FIG. 2 illustrates an exemplary classification technique in accordance with the present invention. Media entities, such as songs 210, from wherever retrieved or found, are classified according to human classification techniques at 220 and also classified according to automated computerized DSP classification techniques at 230. 220 and 230 may be performed in either order, as shown by the dashed lines, because it is the marriage or convergence of the two analyses that provides a stable set of classified songs at 240. As discussed above, once such a database of songs is classified according to both human and automated techniques, the database becomes a powerful tool for generating songs with a playlist generator 250. A playlist generator 250 may take input(s) regarding song attributes or qualities, which may be a song or user preferences, and may output a playlist, recommend other songs to a user, filter new music, etc. depending upon the goal of using the relational information provided by the invention. In the case of a song as an input, first, a DSP analysis of the input song is performed to determine the attributes, qualities, likelihood of success, etc. of the song. In the case of user preferences as an input, a search may be performed for songs that match the user preferences to create a playlist or make recommendations for new music. In the case of filtering new music, the rules used to classify the songs in database 240 may be leveraged to determine the attributes, qualities, genre, likelihood of success, etc. of the new music.

In accordance with the present invention, once the classification chain database 240 takes on a critical mass, defined as the processing of enough media entities to form a reasonably valid rule set and corresponding song database 240 within a threshold tolerance, playlist generator 250 may be a powerful tool for training new humans. For example, if a particular human is having difficulty learning a certain concept, playlists may be formed that emphasize (or de-emphasize) the effect to illustrate the concept in greater depth to a trainee. Naturally, at the outset, before such critical mass is reached, another playlist generator or manually formed playlists may be utilized. The training process of the present invention is described in more detail below. In effect, the rules can be used as a filter to supplement any other decision making processes with respect to the new music.

Figure 3:
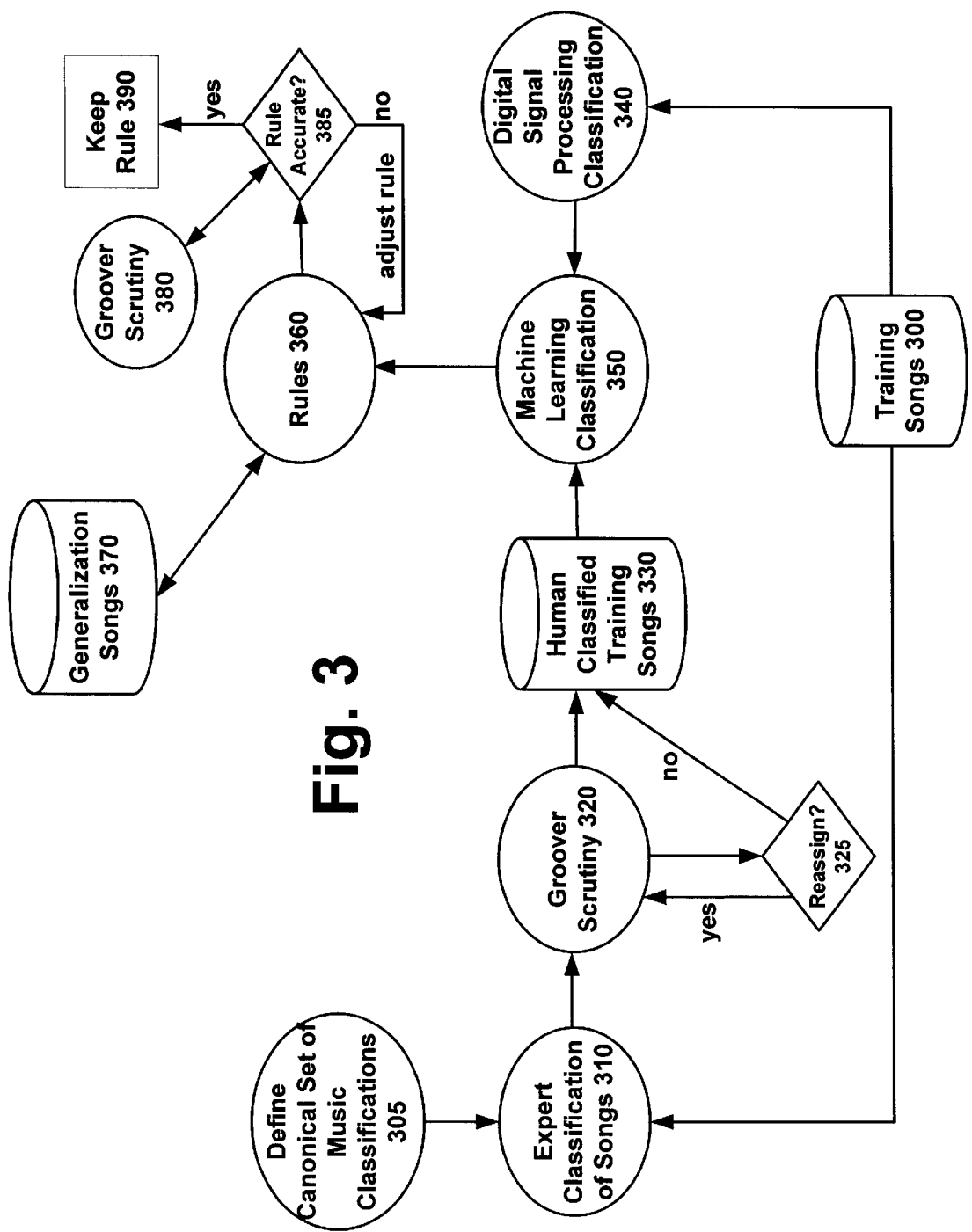
FIG. 3 is block diagram illustrating an exemplary method of the generation of general media classification rules from analyzing the convergence of classification in part based upon subjective and in part based upon digital signal processing techniques.

FIG. 3 illustrates a process that generates generalized rules for a classification system characterized by the convergence of subjective or perceptual analysis and DSP acoustical analysis criteria. A first goal is to train a database with enough songs so that the human and automated classification processes converge, from which a consistent set of classification rules may be adopted, and adjusted to sufficient accuracy. First, at 305, a general set of classifications are agreed upon in order to proceed consistently i.e., a consistent set of terminology is used to classify music in accordance with the present invention. At 310, a first level of expert classification is implemented, whereby experts classify a set of training songs in database 300. This first level of expert is fewer in number than a second level of expert, termed herein a groover, and in theory has greater expertise in classifying music than the second level of expert or groover. The songs in database 300 may originate from anywhere, and are intended to represent a broad cross-section of music. At 320, the groovers implement a second level of expert classification. There is a training process in accordance with the invention by which groovers learn to consistently classify music, for example to 92–95% accuracy. The groover scrutiny reevaluates the classification of 310, and reclassifies the music at 325 if the groover determines that reassignment should be performed before storing the song in human classified training song database 330. The present application describes this training process for training humans to recognize fundamental properties of media entities in greater detail below.

Before, after or at the same time as the human classification process, the songs from database 300 are classified according to digital signal processing (DSP) techniques at 340. Exemplary classifications for songs include, inter alia, tempo, sonic, melodic movement and musical consonance characterizations. Classifications for other types of media, such as video or software are also contemplated. The quantitative machine classifications and qualitative human classifications for a given piece of media, such as a song, are then placed into what is referred to herein as a classification chain, which may be an array or other list of vectors, wherein each vector contains the machine and human classification attributes assigned to the piece of media. Machine learning classification module 350 marries the classifications made by humans and the classifications made by machines, and in particular, creates a rule when a trend meets certain criteria. For example, if songs with heavy activity in the frequency spectrum at 3 kHz, as determined by the DSP processing, are also characterized as 'jazzy' by humans, a rule can be created to this effect. The rule would be, for example: songs with heavy activity at 3 kHz are jazzy. Thus, when enough data yields a rule, machine learning classification module 350 outputs a rule to rule set 360. While this example alone may be an oversimplification, since music patterns are considerably more complex, it can be appreciated that certain DSP analyses correlate well to human analyses.

However, once a rule is created, it is not considered a generalized rule. The rule is then tested against like pieces of media, such as song(s), in the database 370. If the rule works for the generalization song(s) 370, the rule is considered generalized. The rule is then subjected to groover scrutiny 380 to determine if it is an accurate rule at 385. If the rule is inaccurate according to groover scrutiny, the rule is adjusted. If the rule is considered to be accurate, then the rule is kept as a relational rule e.g., that may classify new media.

The above-described technique thus maps a pre-defined parameter space to a psychoacoustic perceptual space defined by musical experts. The process whereby people are trained to be or certified as "musical experts," for purposes of uniformly applying classification techniques is the subject of the present application.

Adaptive Media Property Classification

The present invention relates to a system and methods for automatically classifying data according to perceptual properties of the data and to methods for generating and utilizing a classification chain. The classification chain is suited to the searching and sorting of large databases of sensory data, including, but not limited to, music, image and other media databases.

The operation of the classification chain is broken down into two phases: classification and operation. Human experts undertake the classification phase. U.S. patent appln. Ser. No. [Attorney Docket No. MSFT-0581] describes a system and method for training and certifying trainees to be groovers, or experts qualified to classify data. These experts, who may be first-rate music classification experts for maximum consistency, or groovers who have been trained by those experts, assign each media entity in the data set to one or more classes. Each class corresponds to a given subset of perceptual properties of the data. The classified data is then used to construct an initial classification chain.

In an exemplary non-limiting embodiment, the fundamental properties of media entities, such as songs, are grouped into three main areas: rhythm, zing and mood. Rhythm may include tempo, time signature, rhythm description, rhythm type and rhythmic activity. In the case of mood, the sub-categories may include emotional intensity, mood and mood description. In the case of zing, the sub-categories may include consonance, density, melodic movement and weight. Once a trainee learns the nature of and how to recognize distinctions for these terms, a trainee becomes a groover and may classify new songs or song segments.

In an exemplary non-limiting embodiment for the classification of new songs or song segments, a groover enters values for attributes for the song or song segment including song-level attributes and voice-level attributes. Some of these attributes are similar to the fundamental properties described above. Song-level attributes may include tempo, weight, harmony, intensity, density, consonance, chordal movement, mood, range, flow, dynamics, rhythm description, rhythm type, rhythmic activity, rhythm flexibility, rhythm time signature and description. Voice-level attributes include prominence, melodic movement, intensity, ornamentation, cleanliness, rhythm activity and whether the song has a solo. Values may be entered via discrete adjective descriptors, via continuous or discrete range(s) of numbers, via more subjective terms like, low, medium and high, jagged or smooth, and the like, as long as the classification values used are consistent from segment to segment or from song to song.

Figure 4A:
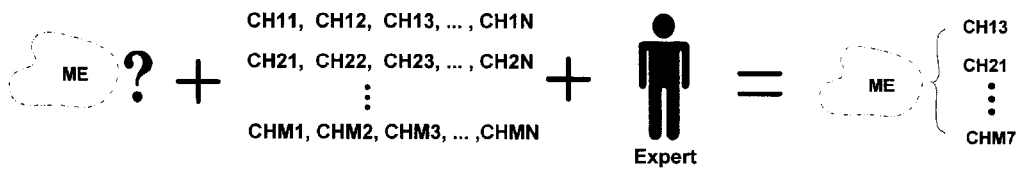
FIGS. 4A through 4D illustrate exemplary aspects of a classification chain in accordance with the present invention.
Figure 4B:
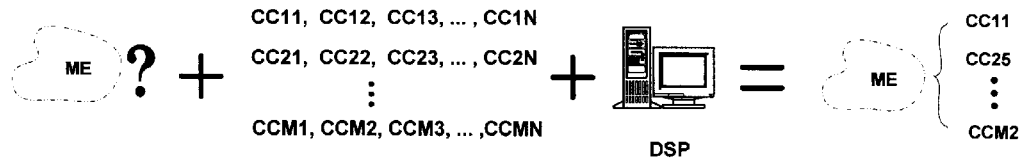

FIGS. 4A through 4D illustrate exemplary aspects of a classification chain as implemented in an embodiment of the present invention. FIG. 4A, for instance, illustrates that an expert or groover assigns to a media entity ME during classification at least one classified-by-human value for various categories or classes CH11, CH12, . . . , CHMN that describe the media entity, such as values for ranges or descriptions of song-level and voice-level attributes (such as those noted in exemplary description above). FIG. 4B similarly illustrates that computing device(s) also assign at least one classified-by-computer value for various categories or classes CC11, CC12, . . . , CCMN that describe DSP characteristics of the media entity ME. Some of these DSP characteristics and techniques for automatically generating those characteristics are described in more detail below. These include measurements of sonic characterization, musical consonance, tempo and melodic movement and are well suited to describing media entities, such as songs.

Figure 4C:
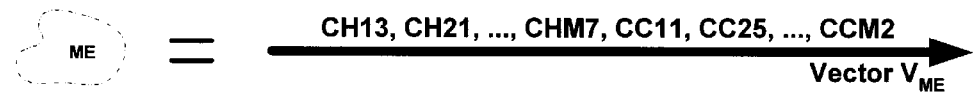
Figure 4D:
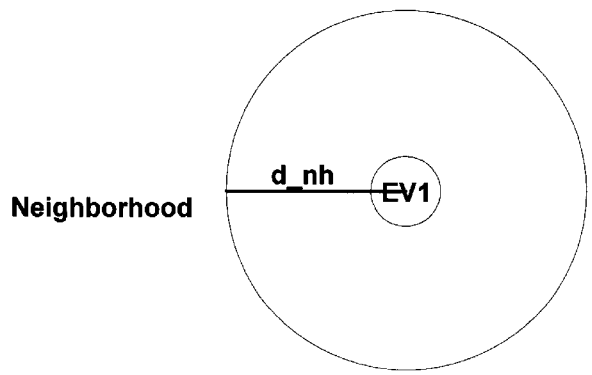

FIG. 4C illustrates an exemplary vector for the media entity ME after said at least one classified-by-human value(s) are assigned and after said at least one classified-bycomputer value(s) are assigned. The values assigned in FIGS. 4A and 4B become part of the vector for the media entity ME. The at least one classified-by-human value(s) and the at least one classified-by-computer value(s), with any other relevant descriptive or classification information or values, are placed in a vector $V_{ME}$, which may then be accommodated in the classification chain input space, such as classification chain input space IS illustrated in FIG. 4D. With the classification chain input space IS, a new unclassified entry vector EV1 maybe input to the space IS, and various searching, matching and/or analyzing of the entry vector EV1 relative to the vectors of the classification chain input space IS may be performed. For example, if another vector is within a distance d_nh of the entry vector EV1, the other vector may be considered within the entry vector EV1's neighborhood, and further calculations and analysis may be based on the vectors contained within EV1's neighborhood. Other distances and/or properties may be useful for analyzing the entry vector EV1 relative to the other vectors in classification chain input space IS as well.

Figure 5A:
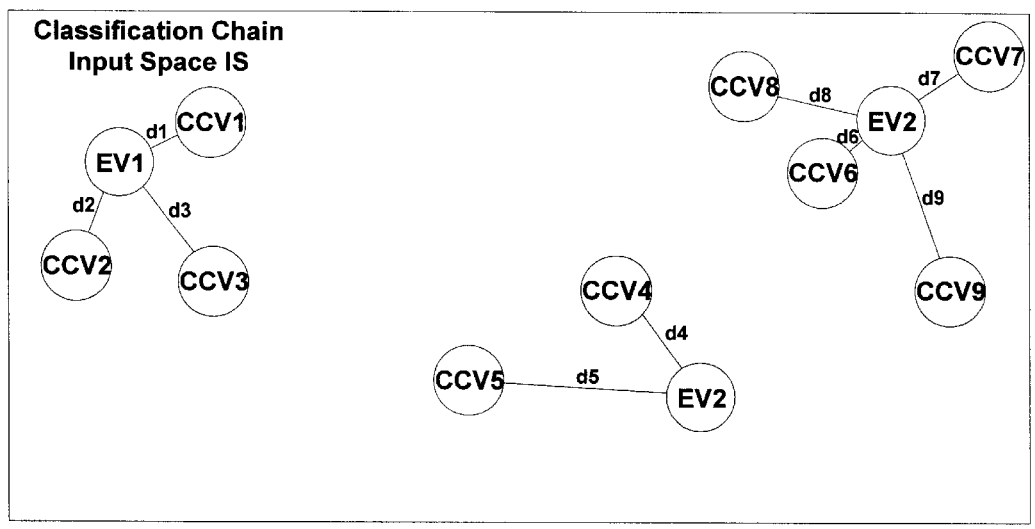
FIGS. 5A and 5B illustrate an exemplary calculation of a distance within which two vectors in classification chain input space are considered to be in the same neighborhood space in accordance with the present invention.
Figure 5B:
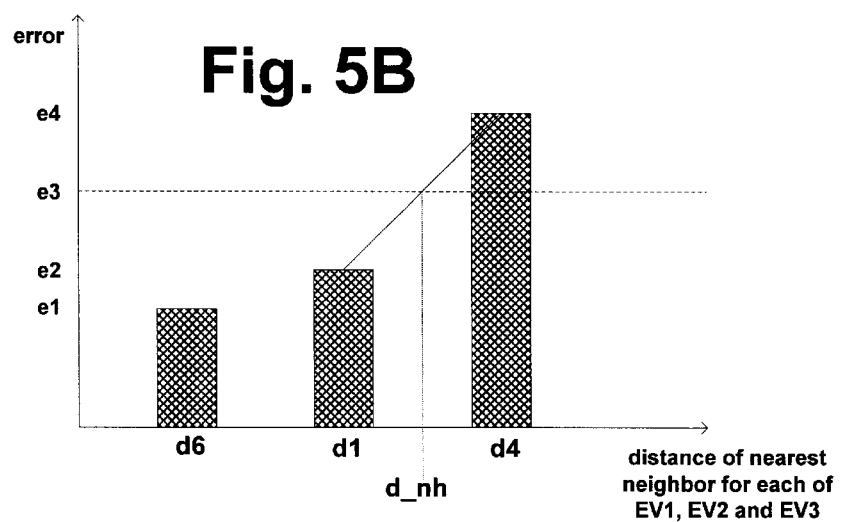

A neighborhood is defined as the region in the input space that is "close" in distance to the point specified by the entry vector. In this regard, distance may be defined as the Euclidian distance: |A–B|, where A and B are vectors, although any distance measurement utilized by those of ordinary skill in the art may be used. FIGS. 5A and 5B illustrate an exemplary calculation of a distance within which two vectors in classification chain input space are considered to be in the same neighborhood space. FIG. 5A illustrates a simplified classification chain input space IS that contains nine (9) vectors CCV1 through CCV9. For purposes of operation of the present invention, the distance within which two points are considered to be in the same neighborhood is determined in the following exemplary manner. First, the nearest entries in the classification chain to several entry vectors EV1, EV2 and EV3 are determined. The several entry vectors EV1, EV2 and EV3 are not members of the classification chain, but have been classified by the human experts. In the example, EV1 is closest to CCV1 at distance d1, EV2 is closest to CCV4 at a distance d4 and EV3 is closest to CCV6 at distance of d6. Then, the distances d1, d4 and d6 between the chain entries and entry vectors EV1, EV2 and EV3 are calculated and/or stored. Then, the class(es) of the nearest entries CCV1, CCV4 and CCV6 are assigned to the input entry vectors EV1, EV2 and EV3, respectively. Then, the classification error, defined as the difference between the classification chain's class(es) estimate and the entry vectors' EV1, EV2 and EV3 class(es) as determined by a human expert, are calculated for each entry vector.

Then, as illustrated in FIG. 5B, a histogram is generated illustrating the classification error for each of the nearest neighbor distances. The maximum distance at which the classification error is acceptable is the neighborhood distance d_nh. In the example shown, e2 is acceptable error in classification and e4 is unacceptable error in classification. Either of distances d and d4 could be chosen as a neighborhood distance, or some distance between d1 and d4 could be chosen as well. For example, in an exemplary embodiment, the linear interpolation between the least acceptable, but still acceptable classification error and least objectionable, but still objectionable classification error is determined. In this example, such interpolation means that e3 is the threshold error that is allowed for same neighborhood vectors, and d_nh is the neighborhood distance, the distance within which two separate vectors may be considered to be within the same neighborhood.

Thus, once enough vectors describe the classification chain input space IS and the neighborhood distance is determined, the classification chain is ready for operation. Thus, once the classification chain is generated with sufficient breadth in representation of media entity classification information, the operation phase for the classification chain may begin. During operation, when presented with an unclassified entry such as an entry vector EV, the classification chain returns an estimate of the class of the entry, as well as a confidence measure that is proportional to the level of confidence of the class assignment. For a simplified example, a classification chain can be constructed to determine the tempo of digitally recorded songs. The new song data is presented to the chain and the chain returns an estimate of the song's tempo as well as a number corresponding to the degree of certainty of the tempo estimate; the larger the confidence number, the more certain the chain is of the classification. If the confidence for the tempo determination is low, an expert or groover may be called upon to find out why. An expert may, for example, determine that a new tempo class should be constructed to accommodate music of the type that generated the tempo estimate of low confidence. Alternatively, the expert may determine that the music may be of a sort that does not lend itself easily to tempo characterization, and thus tempo characterization may not be suitable for that type of music. Other unforeseen aspects of tempo characterization may arise as well. In short, a human may have more insight as to why the classification chain fell short of determining the tempo class with high accuracy or confidence. Over time, as new classes are added to the classification chain or as previous classes are modified, the classification chain becomes a more effective and powerful tool for quickly characterizing new and existing music.

Figure 6A:
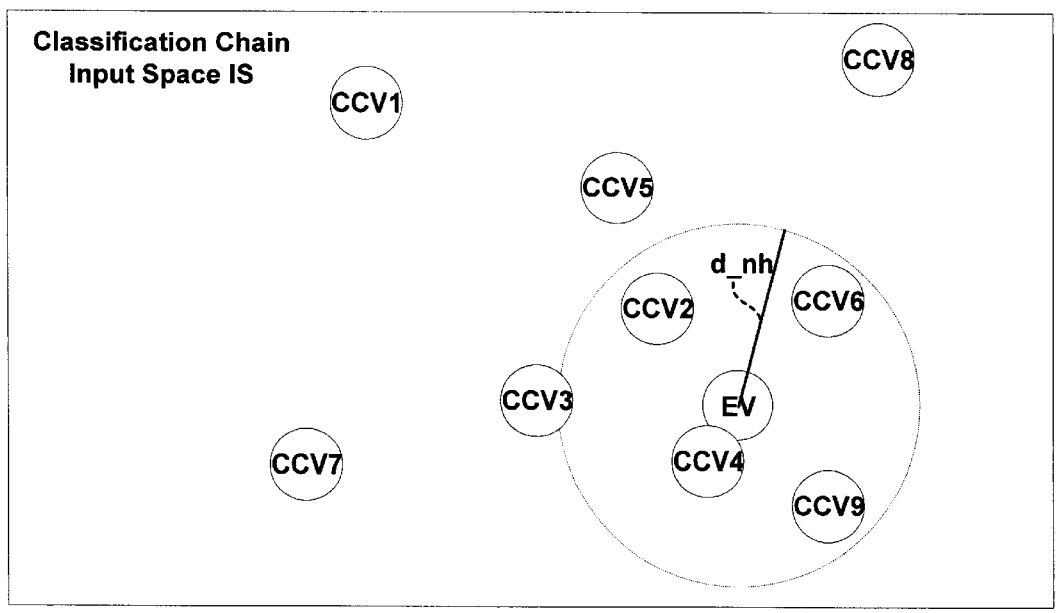
FIGS. 6A and 6B illustrate an exemplary process whereby an entry vector is classified in accordance with other vectors in the classification chain located within the distance calculated in FIGS. 5A and 5B in accordance with a classification process of the present invention.
Figure 6B:
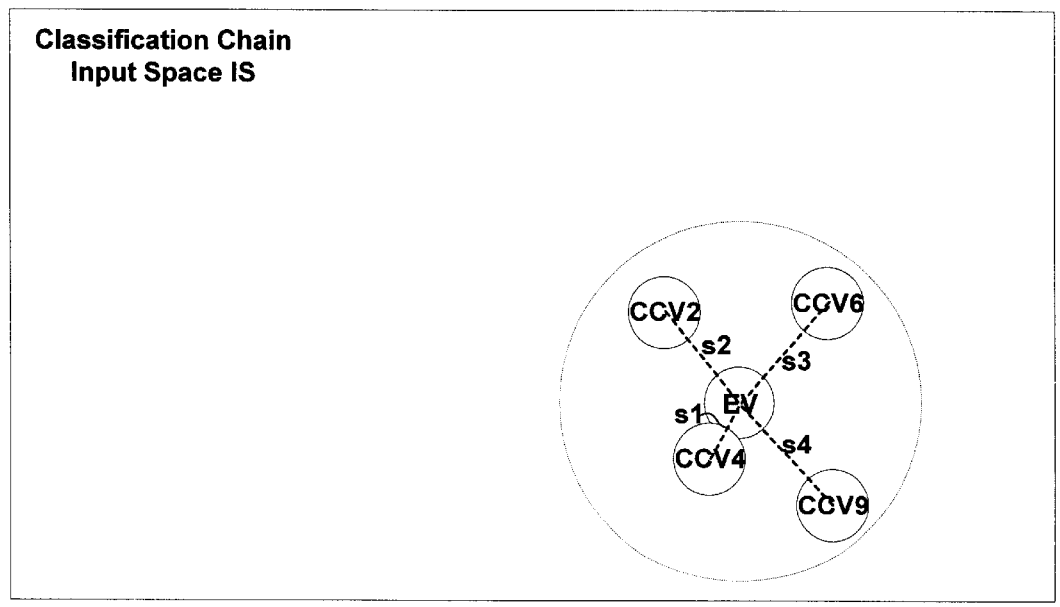

FIGS. 6A and 6B illustrate an exemplary process whereby an entry vector EV is classified in accordance with vectors of CCV1 through CCV9 in the classification chain input space IS that are located within the distance d_nh calculated in FIGS. 5A and 5B. When a new media entity is input to the classification chain for classification, the estimated class returned by the classification chain is determined by calculating the representative class of the neighborhood in which the entity falls. Thus, in the example, CCV2, CCV4, CCV6 and CCV9 are located in entry vector EV's neighborhood because CCV2, CCV4, CCV6 and CCV9 are within distance d_nh, as calculated above.

The input data of entry vector EV may be treated as a vector of N dimensions where N is the number of discrete elements in the data. For a digitally recorded song presented to the classification chain as recorded samples in PCM format, N could be on the order of several million. In many cases, the amount of relevant data can be reduced to a small fraction of that number without affecting the performance of the classification engine. For example, as described below, digital signal processing measurements of sonic characterization, musical consonance, tempo and melodic movement may be made with reduced amounts of data.

When in operation mode, entries such as entry vector EV are presented to the classification chain and an estimate of the entry class is returned along with a measure of certainty. If the classes in the classification chain come from discrete sets, the assigned class is the median class value of all classification chain entries that fall within the input entry's neighborhood, where neighborhood is defined above. The confidence value is the number of classification chain entries within the neighborhood with the median class divided by the number of entries in the neighborhood. In the example of FIG. 6B, CCV2, CCV4, CCV6 and CCV9 are in entry vector EV's neighborhood and at distances s2, s1, s3 and s4, respectively. If CCV2, CCV4 and CCV6 classify EV as having a fast tempo, and CCV9 classifies EV as having a medium tempo, then the classification chain classifies EV as having a fast tempo with 75% confidence. If the classification chain is used to classify a member of a continuous set or range, then the class assigned to media entity is the neighborhood mean. The confidence level is inversely proportional to the standard deviation of the neighborhood values. For example, if CCV2 classified EV as having a tempo of 2, CCV4 classified EV as having a tempo of 3, CCV6 classified EV as having a tempo of 3 and CCV9 classified EV as having a tempo of 4, then the assigned class is a tempo of 3, and the confidence percentage is calculated as a function of the variance i.e., the standard deviation of the numbers 2, 3, 3 and 4.

If the confidence level of an input entry is low, the input entry is sent to a human expert for classification after which, it may be added to the classification chain. In this manner, the classification chain adapts to new data. Precisely what constitutes low must be determined for an application or type of media entity.

The ratio of the number of entries added to the classification chain to the total number of entries presented to the chain is tracked during the operation process to determine if the classification process is succeeding. Ideally, this number should approach zero asymptotically. This assumes that the human classification is without error and that the relevant information is contained in each entry so that classification can succeed. In reality, the ratio eventually converges to some number less than one, but greater than zero. The more successful the classification, the lower the ratio.

Figure 6C:
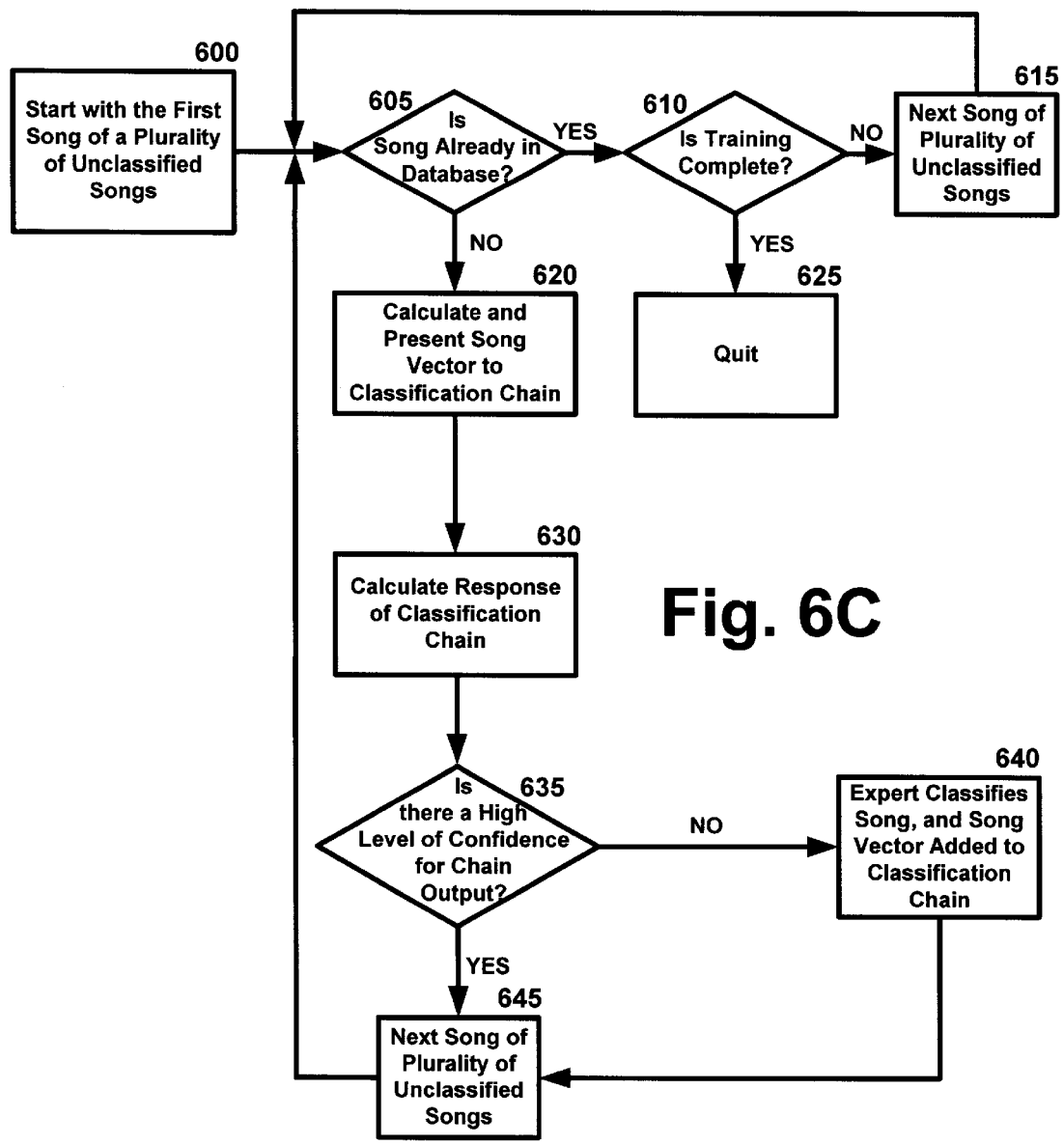
FIG. 6C illustrates an exemplary flow diagram whereby a classification chain input space is trained for improved classification in accordance with the present invention.

FIG. 6C illustrates an exemplary flow diagram whereby the classification chain input space is trained, and "tweaked" over time for improved classification. This process could be performed for a single property, such as tempo, or for a plurality of properties up to the total number of classes and subclasses for the media entity. Having an initial classification chain with which to work as a result of human expert classification of songs, an exemplary fine tuning process utilizing a plurality of unclassified media entities may proceed as follows: At start 600, a first unclassified song is presented. If, at 605, it is determined via a fingerprint or other identification means that the song or portion of the song is already in the database, such as database 240, then the flow proceeds to 610. If at 610, training is complete either because an expert determines that the classification chain is working with threshold accuracy or because the last of the plurality of unclassified songs has been processed, then the process ends at 625. If training is not complete, the next song is presented at 615 and the flow returns to 605. If at 605, it is determined that the song has not yet been entered into the data set or previously classified, a song vector is calculated for the desired properties of the song at 620, and the vector is presented to the classification chain. The classification chain returns a response at 630 i.e., the classification chain returns a class estimate for the input vector and a degree of confidence for the estimate. If there is a high level of confidence for the classification chain's ability to classify the song, there is no need to tweak the classification chain because it worked for its intended purpose, and the next song of the plurality of unclassified songs at 645 is ready to be processed and the process begins again at 605. If the degree of confidence for the classification is low or if an expert determines that there is otherwise a problem with the classification of the song, then the flow proceeds to 640 where the expert assigns values to the song, and then adds the newly classified song to the classification chain for future classifications. In this case, in the future, when an unclassified song is input to the classification chain that is similar to the song classified by the expert at 640, the classification chain will produce a better response than the previous response because it has been further trained to recognize songs of that character.

The present invention provides a number of clear advantages over the prior art. For example, a computing device in accordance with the present invention allows a user to use digital signal processing methods to determine similarities among sounds as judged by a trained human expert. This is in contrast to other methods referenced in the background which use purely signal processing to determine similarities. As mentioned, the main problem with those approaches is that they ignore the observed fact that often times, sounds with similar attributes as calculated by a digital signal processing algorithm will be perceived as sounding very different. This is because, at present, no previously available digital signal processing approach can match the ability of the human brain for extracting salient information from a stream of data. As a result, all previous attempts at signal classification using digital signal processing techniques alone miss important aspects of a signal that the brain uses for determining similarity.

The classification chain of the present invention overcomes this limitation by using humans to create a map that allows one to uncover relationships between various points in the attribute space. In essence, human experts are used to show the classification chain how two points in attribute space, where the attributes are determined by a signal processing algorithm, relate in perception-space. Two points might be very close in attribute space, but quite distant in perception space, and the present invention identifies this distinction because perceptual and attribute space are correlated.

Current implementations of the classification chain show that the correlation mapping is indeed quite complex, which in the case of songs, may require tens of thousands of human classified entries to build a reliable classification chain. This degree of complexity would be extremely difficult to implement in a digital signal processing application without the aid of human training. The present invention also avoids the prohibitively computationally intensive training phases of SOFMs and ANNs. Therefore, the classification chain requires much less processing time before it is ready for processing and classifying data.

Also advantageously, the structure of the classification chain of the invention need not be specified before operation. The classification chain of the invention grows in accordance with its performance, only modifying entries or adding new entries when needed. This is in contrast to hit-and-miss approaches used when designing ANNs and SOFMs.

Method and System for Sonic Characterization

One application for the above-described classification chain is with respect to a measurement of perceived sonic properties of sound. In one aspect, the present invention thus provides a method for automatically classifying and characterizing music according to sonic properties of the media entities. The sonic properties represent the perceived long-term properties of the sound and include various aspects of the sound's timbre, including such notions as: spectral balance, spectral weight of the sound and the perceived spectral density. Spectral balance is a relative measurement of bass energy versus treble energy, i.e., does the sound have more bass energy than treble energy? Spectral weight is a relative measurement of the perceived quality of the sound i.e., is the sound perceived as 'heavy' or 'light'? The perceived spectral density is a relative measurement of how much of the spectrum is perceived as being used. Thus, sonic characterization includes measurements of various aspects of the information content of media entities. Such a method and system may be useful in the indexing of a catalog of sounds, which could be, for example, a collection of sound effects or a music database, such as database 240. The method also helps to determine the sonic similarity between different sounds by utilizing the above-described classification chain techniques. For example, a neighborhood of songs may be determined within which each song has a similar sonic characterization.

The operation of sonic characterization may include a construction phase and a classification phase. During the construction phase, human experts classify a representative set of sounds according to their perceptual qualities. The experts assign to each entry in a representative set of media entities a value or set of values for the perceived spectral qualities of the media entities. After the classification is completed, each sound in the representative data set is reduced to a set of characteristic numbers, referred to as the sound's characteristic vector. When the characteristic vectors of the representative media entities are added to the classification chain input space, new unclassified media entities may be classified based upon media entities found in their neighborhood of the classification chain input space.

The characteristic vector(s) are calculated in the following manner: The sound is first broken up into a plurality of frames, each frame comprised of a fixed number of pulse code modulation (PCM) values, each value representing a sample in the frame. PCM is a digital scheme for transmitting analog data. The signals in PCM are binary and thus represented either by logic 1 (high) and logic 0 (low). Using PCM, it is possible to digitize all forms of analog data, including full-motion video, voices, music, telemetry, virtual reality (VR) and others.

While the present invention works with any format of music data such as .wav, .mp3, .rp, etc., it should also be understood that the invention works with analog data as well since analog data may be converted to digital data. For example, as one of ordinary skill in the art can appreciate that to obtain PCM from an analog waveform at the source (transmitter end) of a communications circuit, the analog signal amplitude is sampled (measured) at regular time intervals. The sampling rate, or number of samples per second, is generally chosen to be several times the maximum frequency of the analog waveform in cycles per second, or hertz. The instantaneous amplitude of the analog signal at each sampling is rounded off to the nearest of several specific, predetermined levels. This process is called quantization and is generally achieved with a power of 2—for example, 8, 16, 32, or 64 quantization levels with respective 3, 4, 5 and 6 quantization bits. The output of a pulse code modulator is thus a series of binary numbers, each represented by some power of 2 bits.

Additionally, it can be appreciated that any digital format may be converted back to analog format. For example, in the case of a PCM signal, at the destination (receiver end) of the communications circuit, a pulse code demodulator, having the same number of quantum levels as possessed by the modulator, may convert the binary numbers back into pulses. These pulses may be further processed to restore the original analog waveform.

Thus, in accordance with an exemplary embodiment describing the calculation of a media entity's characteristic sonic vector, the sound is first broken up into a plurality of frames, with each frame comprised of a fixed number of PCM values, and with each PCM value representing a sample in the frame. For each frame, the energy of the frame is calculated by calculating the root mean squared (RMS) value of the frame. An FFT of that frame is then taken. The entropy content of the frame is then calculated by normalizing the sum of the magnitude of the FFT to one, and then calculating:

$$S = -\sum_{w} p_w \log_2(p_w)$$

where S is the entropy of the frame, $p_w$ is the normalized magnitude of bin w of the FFT, and $\log_2(p_w)$ is the log base 2 of $(p_w)$. The energy in each of several critical bands is also calculated by summing the value of the square of the magnitude of each FFT bin that falls within a given critical band. Measurements are also taken of the derivative of each of the critical band filtered waveforms to gain information about the amount or rate of change of the frequencies represented by the frames of the media entity. The entropy content, derivative and the energy values are calculated for each frame of the media entity. This information then becomes the bases for the sonic characterization vector.

As mentioned, the human auditory system has a limited, frequency-dependent resolution and thus sonic characterization that includes a filter to account for this fact yields better results. This is known generally as critical band filtering. A more perceptually uniform measure of frequency may thus be expressed in terms of the width of the critical bands. These critical bands have less than a 100 Hz width at the lowest audible frequencies, and a width of more than 4 kHz at the high end of the perceptually observable frequency spectrum. The audio frequency range for purposes of perceptual human analysis, for example, can be partitioned into about 25 critical bands.

Figure 7A:
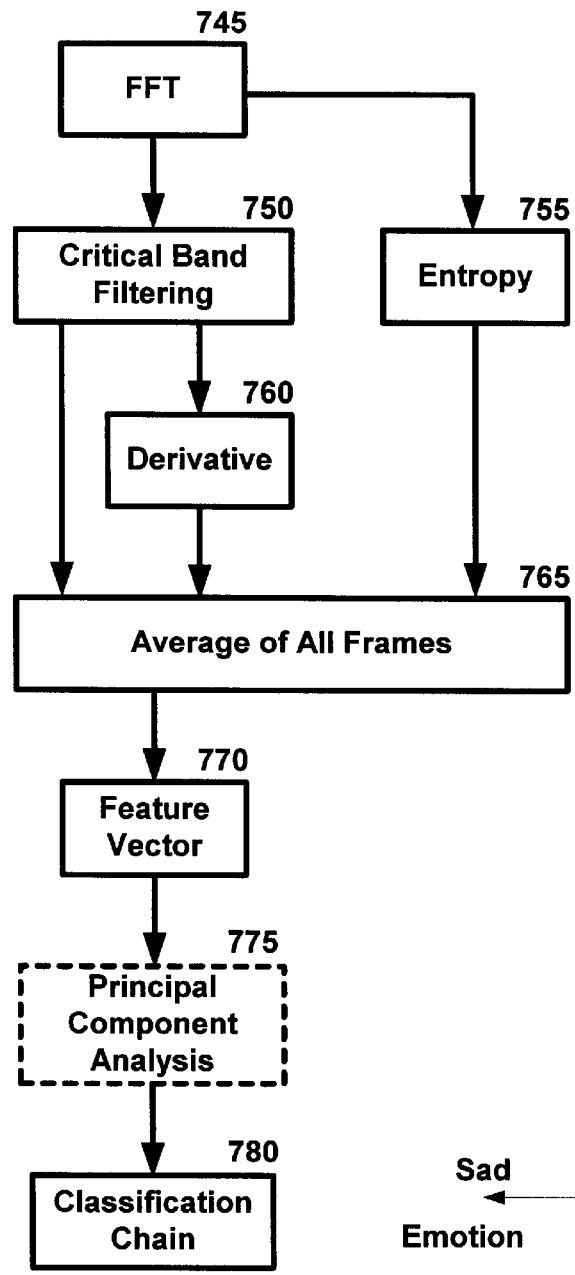
FIG. 7A illustrates an exemplary formation of a sonic vector according to a sonic characterization process of the present invention.

FIG. 7A illustrates an exemplary formation of a sonic vector according to the sonic characterization process of the present invention. At 745, a media entity is received by the system and the data is converted from the time domain to the frequency domain via a Fast Fourier Transform (FFT). The FFT is performed on the frame data to produce a raw digital representation of the spectral characteristics of the media entity. Subsequently, each frame may be processed in the following manner. For each frame of data, at 750, critical band filtering is performed on the data, and the average of the data is calculated at 765. The derivative of the critical band filtered data is also taken at 760, and the derivative data is also averaged at 765. In parallel to 750 and 760, at 755, an entropy calculation according to the above-described equation is performed for each frame. These values too are averaged at 765. In an exemplary embodiment, 12 values result from 12 critical band filtering data sets, 12 values result from a corresponding 12 derivative calculations from the 12 critical band filtering data sets, and 1 value for the entropy form the feature vector at 770. Principal Component Analysis (PCA) may optionally be performed at 775 on the feature vector data in order to extract the orthogonal or most salient features from the data in terms of what it represents. The feature vector may then be added to the classification chain at 780. Once enough feature vectors are added to the classification chain, the classification chain is ready for operation.

In addition to the calculation of the mean of each value at 765, the standard deviation of each value may also be calculated. The resulting values are the numbers that comprise the characteristic vector for the sound data presented. These values are then stored in a classification chain for use as described above in the Adaptive Media Property Classification section.

Thus, during operation of the classification chain, when an unknown sound is presented to the device for classification, its characteristic vector is calculated and presented to the classification chain mentioned above. The classification chain then returns an estimate of the spectral properties of the sound data, as well as confidence level for those spectral properties.

The described system and method allows the user to employ digital signal processing methods to determine the perceived sonic properties, in a manner that simulates the results that would be assigned by a trained human expert. This is in contrast to other approaches that use more traditional digital signal processing techniques to classify sonic attributes of a particular sound. By using a large collection of data that has been classified by trained experts, an approximation to the complex processing function performed by the brain is obtained. As more data is presented, the system and techniques improve their ability to classify, as results that are returned from the classification chain with a low confidence are categorized by humans and then entered into the classification chain. This results in a dynamic system that is able to improve performance over time.

Figure 7B:
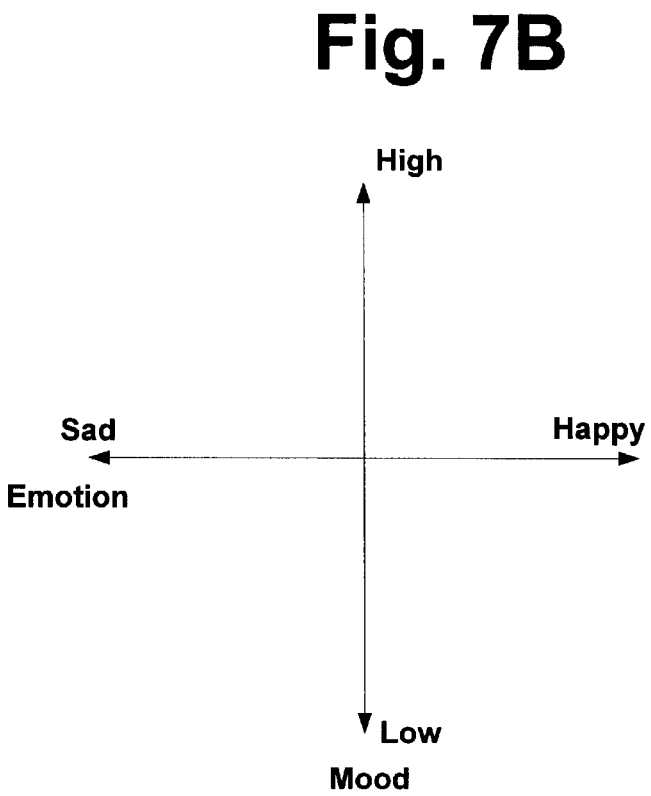
FIG. 7B represents two types of perceptual properties that the sonic characterization classification chain space of the invention may classify.

FIG. 7B represents two types of perceptual properties that the sonic characterization classification chain space may classify: mood and emotion. Intuitively, when listening to a song, a listener or expert can assign a relative happiness or sadness to the music. This describes the mood of the song. Similarly, even within a mood class, a listener or expert could assign an intensity to the happiness or sadness from low to high. For the same reason, an emotionally intense song could range anywhere from sad to happy. The sonic characterization classification chain input space correlates well to these properties. It is of import in this regard that spectral changes weigh into sonic characterization.

Method and System for Musical Consonance Classification

One application for the above-described classification chain is with respect to a measurement of perceived consonance of sound. Consonance is a measurement of the perceived harmony or agreement among components of an audio entity, and generally relates to the correspondence or recurrence of sounds. In one aspect, the present invention thus provides a method for automatically classifying and characterizing musical consonance.

Such a method and system may be useful in the indexing of a catalog of sounds, which could be, for example, a collection of sound effects or a music database, such as database 240. The method also helps to determine songs having similar or dissimilar consonance by utilizing the above-described classification chain techniques. For example, a neighborhood of songs may be determined within which each song has a similar consonance.

Figure 8A:
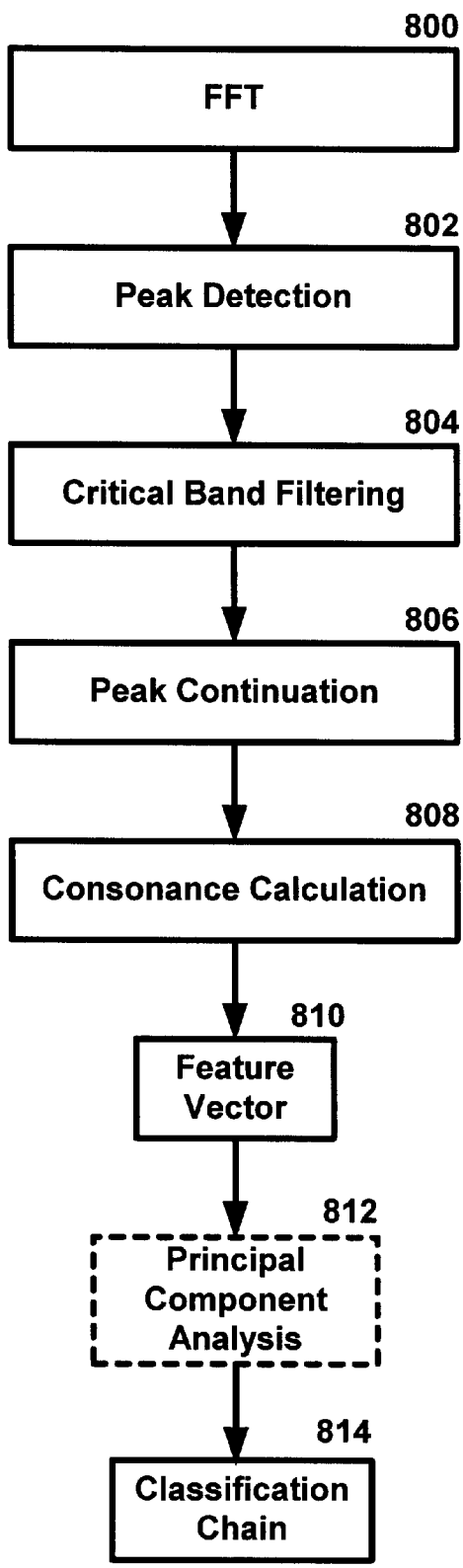
FIG. 8A illustrates an exemplary flow diagram for a consonance calculation of the present invention.

As illustrated in FIG. 8A, after performing an FFT on a data entry at 800, the invention includes a peak detection and interpolation phase 802, a scalable critical band masking or filtering phase 804, a peak continuation phase 806, an intervals or consonance calculation phase 808 and a classification phase 814. A feature vector 810 is extracted from the consonance calculation phase 808, and optionally PCA may be performed on the feature vector at 812 to extract the salient information represented by the vector data. An audio entity, such as a song represented by raw PCM audio data, is read into the peak detection and interpolation stage where the most prominent peaks in the frequency domain along with their energies are detected and recorded into output matrices. These matrices are then fed through the scalable critical band masking stage, the peak continuation stage, and then into the intervals calculation stage where the frequency of ratios between peaks are stored into a final output vector for each sound. This vector is then fed into the classification chain which interprets the output vector and which may assign a consonance value for the sound.

Peak detection 802 is performed on a frame-by-frame basis of an audio file by recording the locations and energies of the peaks in the spectrum for each frame. The top P number of most energetic peaks are selected for each frame and recorded with their respective energy into outputs vectors for each frame, where P is a pre-defined parameter. These peak energies and locations are then Nth-order interpolated to increase precision. The final output is two P×F matrices, where F is the number of frames: one holding the P maximum peak locations (frequency in Hz) for each frame, and the other holding the respective energy value for the peak location in each frame.

Figure 8B:
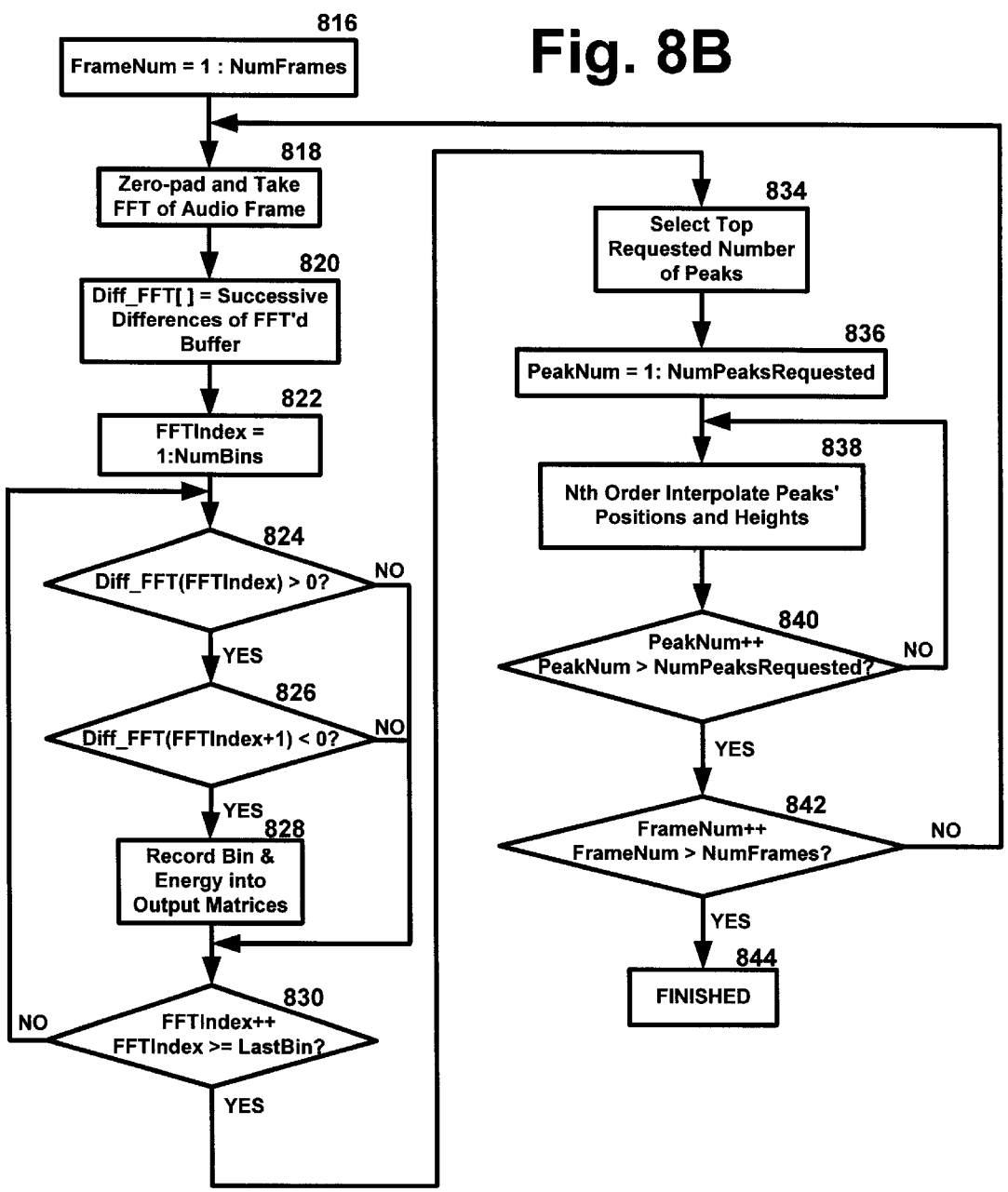
FIGS. 8B and 8C illustrate exemplary flow diagrams for a peak detection and interpolation phase and a peak continuation phase, respectively, for musical consonance and melodic movement calculations in accordance with the present invention.

The peak detection and interpolation phase 802 may be described in more detail with reference to FIG. 8B illustrating a flow diagram of some exemplary non-limiting pseudocode which one of ordinary skill in the art might implement among many different software or firmware realizations of the present invention. At 816, a loop is set for a current frame number to run from the first to last frame for the audio segment. At 818, zero-padding is performed as necessary to create uniform frame length, and the FFT of the data is performed. At 820, an estimate of the derivative of the FFT frame is calculated by storing the value of the difference between adjacent bins in the given frame. This frame is referred to as the difference frame. At 822, a new loop from 1 to the number of bins in the difference frame is started. For each location in the difference frame, if the value at that location is greater than zero, as determined at 824, and the value at the next location is less than zero, as determined at 826, then the bin at the location and its energy is recorded into the output matrices at 828. If either the value at that location is not greater than zero, as determined at 824 or the value at the next location is not less than zero, as determined at 826, then the loop is repeated for the next location in the difference frame without recording into the output matrices, until the loop is performed for the last bin in the difference frame.

Thus, this determination is repeated for each bin in the difference frame until the last bin is reached at 830, at which point all peaks in the FFT frame have been identified. At 834 the number of requested peaks are identified. Then, at 836, another loop is set to run from 1 to the number of peaks requested. At 838, an Nth order interpolation of the peaks' positions and heights is performed to increase the accuracy of these values until the number of peaks requested is reached at 840. When all of the peaks for the number of peaks requested have been Nth order interpolated, the processing for the next frame begins at 842 until all of the frames have been processed.

The scalable critical band masking phase 804 filters and removes any peaks that are masked by surrounding peaks with more energy. The amount of masking is scalable, and this feature can be turned off completely. Thus, this is a technique whereby the significance of peaks having less energy than surrounding peaks with greater energy can be eliminated or reduced.

The peak continuation phase 806 is performed by keeping track of peaks that last for more than a specified number of frames, and by filling in peaks where they may have been missed for one or more instances in time. An exemplary implementation of a peak continuation process in accordance with the present invention is performed at 868, described in more detail below. This is accomplished by using peak guides' that are initially set to the peak locations in the first frame, and then on a frame-by-frame basis, finding a suitable guide for each peak within the frame. If a guide is found, then the peak-energy data is saved and continued, otherwise the data is discarded.

Figure 8C:
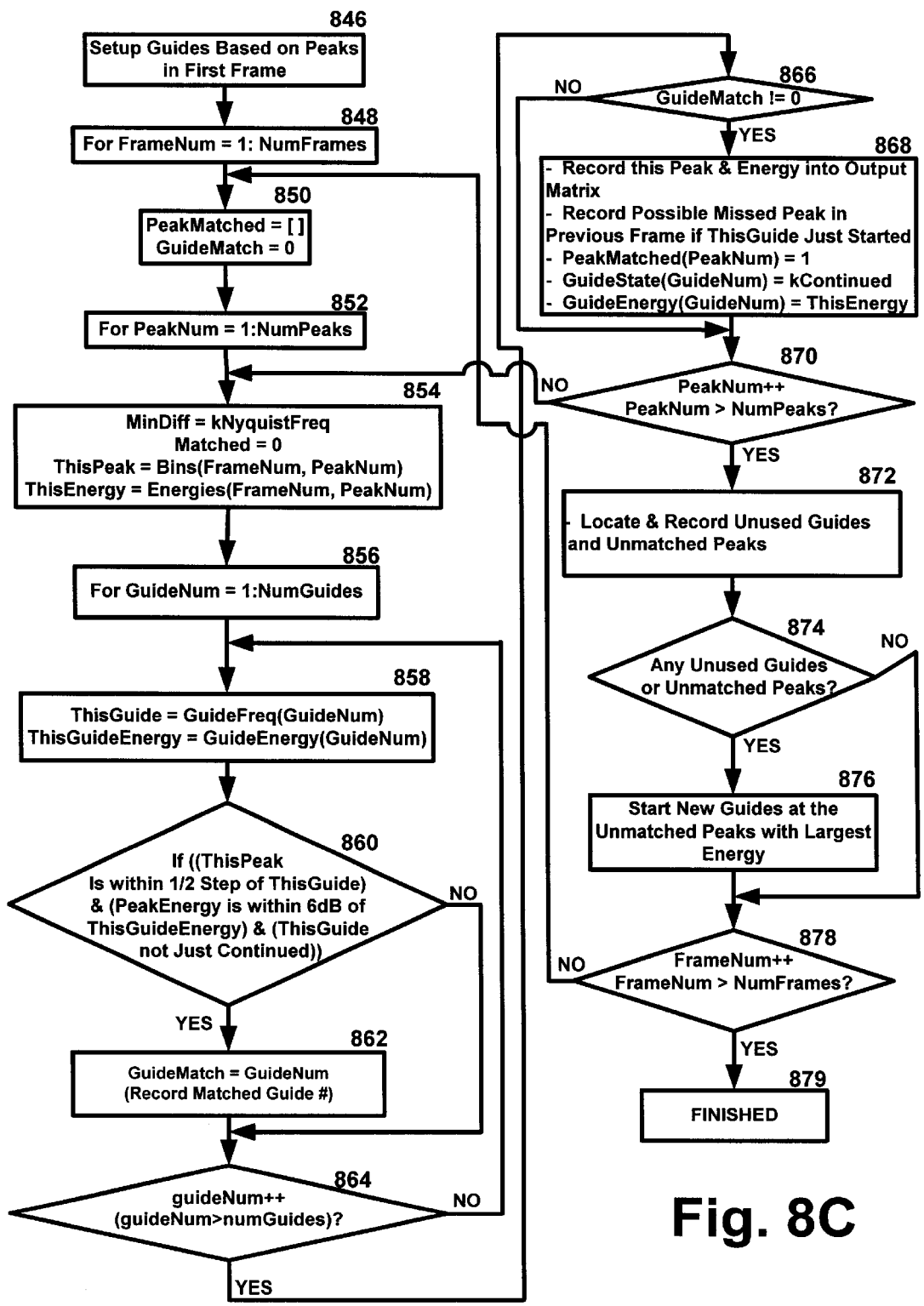

The peak continuation phase 806 may be described in more detail with reference to FIG. 8C illustrating a flow diagram of some exemplary non-limiting pseudocode which one of ordinary skill in the art might implement among many different software or firmware realizations of the present invention. At 846, initial guides are set in place based on the peaks found in the first frame. Then, a loop is started at 848 to cycle through the number of frames set for the media entity, such as a song. At 850, a peakmatched vector is initially set to a null set, and guidematch is set to zero. At 852, another loop is started to cycle through the number of peaks in the current frame. Next, at 854, a variable MinDiff is defined as a constant k times the Nyquist Frequency, corresponding to the signal's sampling rate. Matched is initially assigned zero. A ThisPeak value is set to the bins matrix values at the current frame number and current peak number. A ThisEnergy value is set to the energy matrix values at the current frame number and current peak number. Then, at 856, another loop is started to cycle through the guide numbers. At 858, a variable ThisGuide is set to the guide frequency for the current guide number and a variable ThisGuideEnergy is set to the guide energy of the current guide number. Once these values are set for a given frame number, a given peak number and a given guide number, at 860, (i) if the ThisPeak matrix value is within ½ step of ThisGuide, where a value is within ½ step when that value is within ThisGuide×$2^{\pm 1/12}$, (ii) the ThisEnergy matrix value is within a threshold logarithmic distance, such as 6 dB, of ThisGuideEnergy and (iii) ThisGuide was not just continued, then flow proceeds to 862. In this regard, in an exemplary non-limiting embodiment, if the state of ThisGuide is 2, then ThisGuide was just continued. If, at 860, the ThisPeak matrix value is not within ½ step of ThisGuide or the ThisEnergy matrix value is not within the threshold distance of ThisGuideEnergy or ThisGuide was just continued, then flow proceeds to 864.

At 862, Guidematch is assigned to the current guide number to record the matched guide number as determined at 860. At 864, the current guide number is increased and 858 to 864 are performed until the guides have been tested against the current peak in the frame. Thus, if a guide corresponded to the current peak during the cycle, at 866, guidematch will be non-zero and 868 will be performed. If, however, no guides corresponded to the peak during the cycle, the flow proceeds to 870 to move on to the next peak, and processing thereof beginning at 854. At 868, the peak that corresponded to the guide has its frequency and energy recorded into an output matrix. In addition, any possibly missed peaks in the previous frame are recorded if ThisGuide was just started. The PeakMatched array is assigned 1 at the peak number position. Also, a GuideState array and GuideEnergy array for the guide number position are assigned to the number of times the guide has continued and to the ThisEnergy value, respectively. At 870, if all of the peaks for the frames have been processed, the flow proceeds to 872, where unused guides and unmatched peaks are located and recorded. If, at 874, there are any unused guides or unmatched peaks, then, at 876, new guides are started at the unmatched peaks with the largest energy and the flow proceeds to 878. If not, flow proceeds directly to 878. At 878, the next frame is made ready for processing to repeat the procedure beginning at 850, until all frames have been processed and the algorithm finishes at 879.

An alternative procedure for implementing the peak continuation process represented by 868 includes (i) at the current frame, recording this peak and energy into an output matrix, (ii) if this guide was just started, e.g., guide's active state equals zero, then search for a peak match, e.g., similarly to 860, at some pre-specified number of frames previous to the current frame, for instance, 2 frames previous to the current frame and (iii) if there is a match, then record this peak and energy in all frames between the current frame and the frames that have been gone back over, i.e., the previous frames that have been analyzed for missed peaks.

The peaks intervals calculation stage 808 creates a vector, e.g., a 1×24 output vector, containing the mean energy of the ratio between peaks for all frames. This vector is created by binning the number of occurrences of 'ratio' (when less than two octaves, or 25) in the following equation:

$$ratio = nearest\_integer(12*log2(peak\ 1/peak2))$$

All peaks within each frame are compared to others in that frame, and this is done for all frames. Finally, the "intervals" vector is divided by the number of total frames to get the mean value for each ratio. Additional values beyond two octaves may be wrapped to the two octaves as if within the two octaves for purposes of calculation.

The peak intervals calculation phase 808 may be described in more detail with reference to FIG. 8D illustrating a flow diagram of some exemplary non-limiting pseudocode which one of ordinary skill in the art might implement among many different software or firmware realizations of the present invention. At 880, a FrameNum variable is set to loop from 1 to the number of frames. At 882, a PeakBottom variable is set to loop from 1 to the number of peaks in the frame. At 884, a denominator value is set to the peak location matrix value at the current frame and PeakBottom value. At 886, if the denominator value is non-zero then, at 888, a PeakTop variable is set to loop from 1 to the number of peaks as well. If the denominator is zero, then the flow proceeds to 900. At 890, a numerator value is set to the peak location matrix value at the current frame and PeakTop value. In an exemplary embodiment, at 892, if the numerator value is non-zero, then, at 894, a ratio value is assigned to the nearest integer to the expression [12 times the log base 2 of (the numerator value over the denominator)]. If the numerator value is zero, then the flow proceeds to 900. At 896, if the ratio value is between 0 and 25, then at 898, an intervals array keeping track of cumulative values for a given ratio value is incremented by the expression the square of the energies at the current frame number and current PeakBottom value and the square of the energies at the current frame number and current PeakTop value. At 900, it is determined whether the last PeakTop value has been processed. If not, the flow returns to 890 for further processing of the next ratio based upon the new numerator value. If so, then, the flow proceeds to 902 where it is determined whether the last PeakBottom value has been processed. If not, the flow returns to 884 for processing of the next ratio based upon the new denominator value. If so, then the flow proceeds to 904 where it is determined whether the last frame has been processed. If not, the flow proceeds to 882 where processing of the next frame according to steps 882 to 902. If the last frame has been processed, then the flow proceeds to 906 wherein the means of the interval array values are calculated. At 908, the interval array or vector is normalized and the flow completes at 910.

Then, operation of the classification chain 814 may be performed. Operation of the classification chain 814 may include two phases: classification and operation. Human experts, as described above, may undertake the classification phase. These experts assign each entry in the data set, to one or more musical consonance classes, corresponding to some relevant perceptual consonance properties of the data. The classified data is then used to construct the initial classification chain. With the initial classification chain, the classification may be "tweaked," for example, in accordance with the process illustrated in FIG. 6C. Once the classification chain is ready for operation, it may be used to classify or otherwise relate songs according to their consonance properties.

Method and Process for Melodic Movement Classification

The present invention also provides a system and methods for automatically quantifying and classifying melodic movement in a media entity.

Figure 9A:
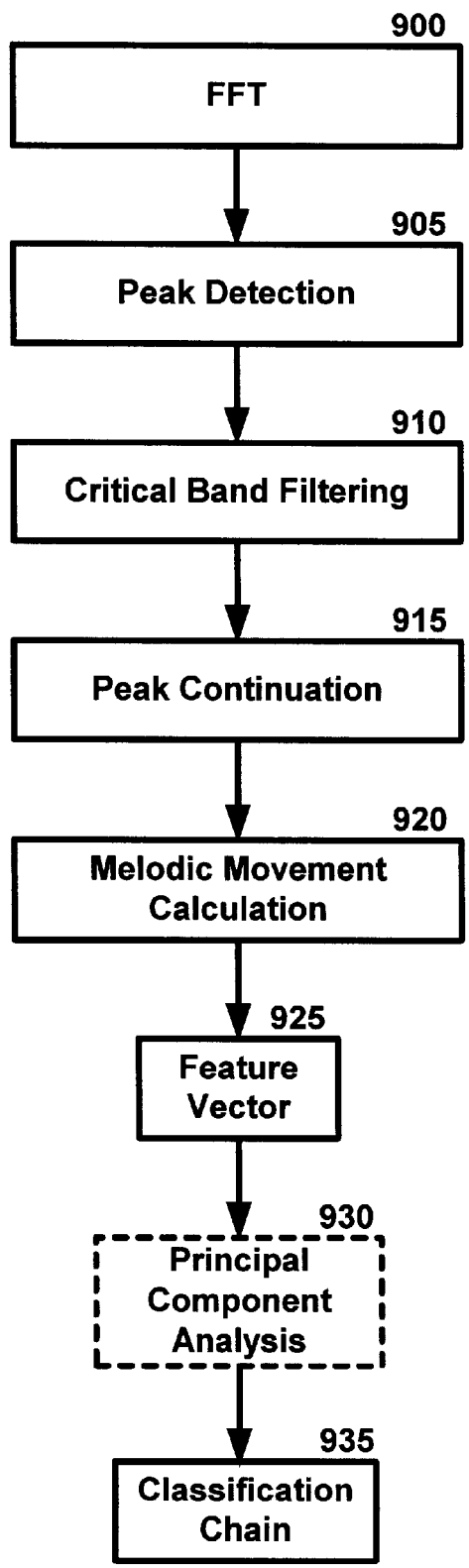
FIG. 9A illustrates an exemplary flow diagram for a melodic movement calculation of the present invention.

As illustrated in FIG. 9A, the automatic quantification and classification of melodic movement of a media entity may include a peak detection and interpolation phase 905, a critical band masking phase 910, a peak continuation phase 915, a melodic movement vector calculation 920 and 925, a principal component analysis (PCA) transform stage 930 and a classification phase 935.

Sound, such as PCM audio data, after taking the FFT at 900 is read into the peak detection and interpolation stage 905 where the most prominent peaks along with their energies are detected and recorded into output matrices. These matrices are then fed through the critical band masking stage 910, the peak continuation stage 915, and the melodic vector calculation stage 920. The Melodic vector of 925 is then optionally multiplied by the principal component matrix at 930, and fed into the classification chain at 935, which finally determines the melodic movement value for the sound.

With the peak detection and interpolation phase 905, peak detection is performed on a frame-by-frame basis of an audio file by recording the maximum peak locations and energies in the frequency spectrum for each frame. The top P, a user specified parameter, number of peaks are selected for each frame and recorded with their respective energy into output vectors for each frame. These peak energies and locations are then Nth-order interpolated to increase precision. The final output is two P×F matrices: one holding the P maximum peak locations (frequency in Hz) for each frame (F total frames), and the other holding the respective energy value for the peak location in each frame. An exemplary implementation of the peak continuation phase 915 may be the peak continuation phase as described above in connection with FIG. 8B.

The critical band masking stage 910 filters and removes any peaks that are masked by surrounding peaks with more energy. The amount of masking is scalable, and this feature may be turned off completely and thus is optional.

The peak continuation phase 915 is performed by keeping track of peaks that persist for more than a specified number of frames, and by filling in peaks where they may have been missed. This is accomplished by using peak "guides" that are initially set to the peak locations in the first frame, and then on a frame-by-frame basis, finding suitable guides for each peak within the frame. If a guide is found, then the peak energy data is recorded and continued, otherwise the data is discarded. An exemplary implementation of the peak continuation phase 915 may be the peak continuation phase as described above in connection with FIG. 8C.

The melodic vector calculation stage 920 creates a 1×24 output vector containing the standard deviation of the pitch-class-movement vectors for each frame. This 'pitch-class-movement' vector is created by binning and summing the energy in the first 24 pitch classes (two octaves) for each peak in a frame. After all frames have been calculated, the approximate first derivative is taken with respect to time, and finally the standard deviation to give the 1×24 melodic vector for the entire sound.

Figure 9B:
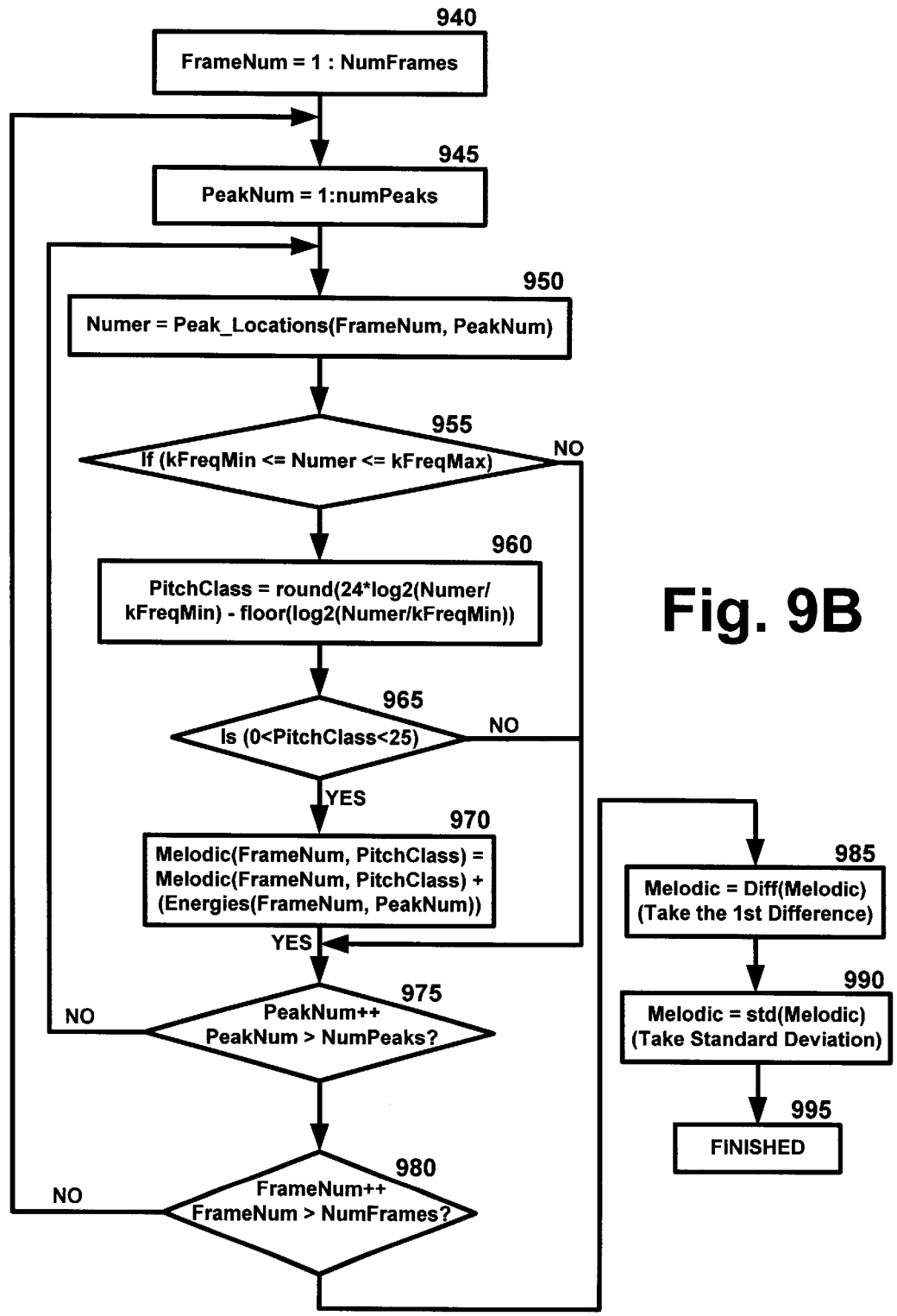
FIG. 9B illustrates an exemplary melodic vector calculation phase in accordance with a melodic movement calculation of the present invention.

The melodic vector calculation phase 920 may be described in more detail with reference to FIG. 9B illustrating a flow diagram of some exemplary non-limiting pseudocode which one of ordinary skill in the art might implement among many different software or firmware realizations of the present invention. At 940, a FrameNum variable is set to loop from 1 to the number of frames. At 945, a PeakNum variable is set to loop from 1 to the number of peaks in the frame. At 950, a numerator value is set to the peak location matrix value at the current frame and PeakNum value. At 955, if the numerator value is between or equal to either of k (a constant) times the minimum frequency and k times the maximum frequency, then at 960, the PitchClass is determined according to a mathematical expression, such as: round(24 times the log base 2 of (the numerator value divided by k times the minimum frequency)) minus floor(the log base 2 of (the numerator value divided by k times the minimum frequency)). If the numerator value is outside the boundaries of k times the minimum frequency and k times the maximum frequency, then the flow proceeds to 975. At 965, if the PitchClass is between 0 and 25, then at 970, the Melodic matrix value for that FrameNum and PitchClass cumulatively receives the value of the Energies matrix for that FrameNum and PeakNum. If the PitchClass is not between 0 and 25, then the flow proceeds to 975. At 975 and 980, either the PeakNum or FrameNum loop values are updated until 950 to 970 have been performed for each of the frames and each of the peaks. At 985, a first order difference vector matrix is formulated from the melodic vector matrix. At 990, the standard deviations of the first order difference vector matrix values are calculated and the flow ends at 995.

With the optional principal component transform phase 930, the melodic vector is concatenated and the matrix is multiplied by a principal component matrix. This transforms the vector into a principal component coordinate system defined by the classification chain in order to extract the salient features of the information represented thereby.

The operation of the classification chain 935 may be broken down into a classification phase and an operation phase. As described in more detail above, human experts undertake the classification phase. These experts assign each entry in the data set to one or more classes corresponding to the relevant perceptual properties of the melodic movement of the data. The classified data is then used to construct the initial classification chain for classification of media entities according to their melodic movement properties. As mentioned, principal component analysis may be used to reduce the amount of data, and to remove redundancy in the chain.

System and Method for Tempo Classification

One application for the above-described classification chain is with respect to a measurement of perceived sound tempo. Tempo is the "pulse" or the "heart beat" of a musical performance. In essence, the tempo conveys the perceived velocity of the performance. Tempo may be described as the rate of motion or activity, or as the rate of speed of a musical piece or passage indicated by one of a series of directions e.g., largo, presto, or allegro. In one aspect, the present invention thus provides a system and method of determining tempo given a data representation of a musical performance. This may be used in an automated system, for example, to classify a large database of music according to its tempo properties, as described above in connection with the adaptive media processes of the invention. It can be used independently to give a reliable tempo determination of a given piece of music.

The input to the tempo classification system is a media entity, such as a song. A media entity, such as a song, may be represented in variety of digital formats, whether or not converted from analog. Such formats include a computer data file, such as a ".wav" file extracted from a music compact disc or an ".mp3." Using the tempo classification methods of the invention, as described below, this data is distilled to a more compact representation that is suited to addition to a classification chain. The output of the classification chain, after training of the classification chain, thus provides a reliable estimate of the tempo.

The data used is generally in the form of monophonic "raw" digital data, such as PCM data. To form such raw data, various components of a data stream may require stripping. For example, a track ripped from a CD may be stripped of any header information and converted to raw mono 44 kHz 16 bit data. An "mp3" may be converted to a "wav" file and converted to mono, along with removing any header information. Any format, however, may be processed to provide for uniform data representation. Thus, the present invention can also work with data of other sampling rates and resolutions provided the audio quality is not noticeably compromised.

In accordance with the tempo measurement of the invention, for a 44 kHz sampling rate, the data is decimated to a representative envelope 1024 times smaller than its original size. For other sampling rates the decimation factor is adjusted to yield approximately a 43 Hz sampling rate. This sampling rate in conjunction with the rest of the processing, while not a non-limiting design choice, provides an ideal resolution for tempo determination. In the case of 44 kHz sampled media entity, the decimation may be performed by taking the square root of the sum of the squares of the 1024 samples, although other well known sub-sampling or averaging techniques may be used.

In an exemplary implementation, the method for determining tempo properties of a media entity exaggerates and accentuates the tempo characteristics of an envelope generated by processing the raw data. At the same time, the method also smoothes the envelope and removes from the envelope biases and trends. This includes performing a first order difference calculation followed by performing half wave rectification. A median filter may be applied to smooth out aberrations, biases and/or trends. Then, after the mean value is subtracted, the data may be half wave rectified again. Then, another first order difference calculation may be performed, followed again by half wave rectification.

The resulting waveform from the above processing is used to generate the final data that may be input, for example, to a classification chain. The final data consists of 130 values or "bins" reflective of the different correlation strengths at different time periods or frequencies. The final data is generated by looping through the decimated waveform and accumulating the base two logarithm of the product of pairs of points located at a fixed offset from each other. This is done 130 times for offsets spanning from 1 to 130 samples.

The 130 values of the final data are fed into a classification chain that is built upon an existing database classified by humans. Then, the overall distance between the input data vector and each individual point in the database is computed. First, the distances between each of the 130 individual dimensions of the input vector versus each individual point in the database are measured. The distances for each dimension are squared and added together. The square root of the sum of these values gives the overall distance between the input vector and each individual point in the database. If this value is below a given threshold for a given input vector and database point pair, this distance value, along with the tempo value associated with the specific point from the database are added to a table.

After cycling through the entire list of points in the database, a table of distance and tempo values is generated. The distance values are translated into confidence values which are proportional to 1/distance^4. The tempo values are translated into a class and octave component by dividing by 10 and taking the base 2 logarithm of the result. The integer portion represents the octave component and the fractional part represents the class component.

The tempo components are then averaged in a manner to find the best tempo representation for the input vector. First, each class component value in the table is mapped to an angular representation by multiplying by $2\pi$. The sine and cosine of the resulting values are separately taken and multiplied by the corresponding confidence value. All of the generated sine values are accumulated together and all of the generated cosine values are accumulated together. The sum of the sine values is divided by the sum of the cosine values and a four quadrant inverse tangent is taken. The resulting angle, ranging between 0 and $2\pi$ is mapped back to a value between zero and one, determining the overall class component estimation for the input vector.

The class component estimation is used to determine a threshold to help generate the overall octave component estimation of the input vector. Each class entry in the table has an associated octave component. If the overall class component estimation is greater than 0.5, each class entry is compared to this value minus 0.5, and if it is less, the corresponding octave component is decremented. Inversely, if the overall class component estimation is less than 0.5, each tempo entry is compared to this value plus 0.5, and if it is more, the corresponding octave component is incremented.

The octave components may be used as indexes into an accumulative array. The array is initialized to zeros and for each table entry, and the octave component determines the index to which the corresponding confidence value is accumulated. By cycling through all of the table indices, the table index with the largest value is assigned to the overall octave component estimation for the input vector.

This process returns two values. The first value is the final tempo estimation. In an exemplary calculation, this value is obtained by calculating the result of the expression: 2^ (overall tempo component estimation plus overall harmonic component estimation) multiplied by 10. The second value returned is the overall confidence. In an exemplary calculation, this value is obtained by calculating the result of the expression: the square root of the sum of the square of the accumulated sine values and the square of the accumulated cosine values.

Figure 10:
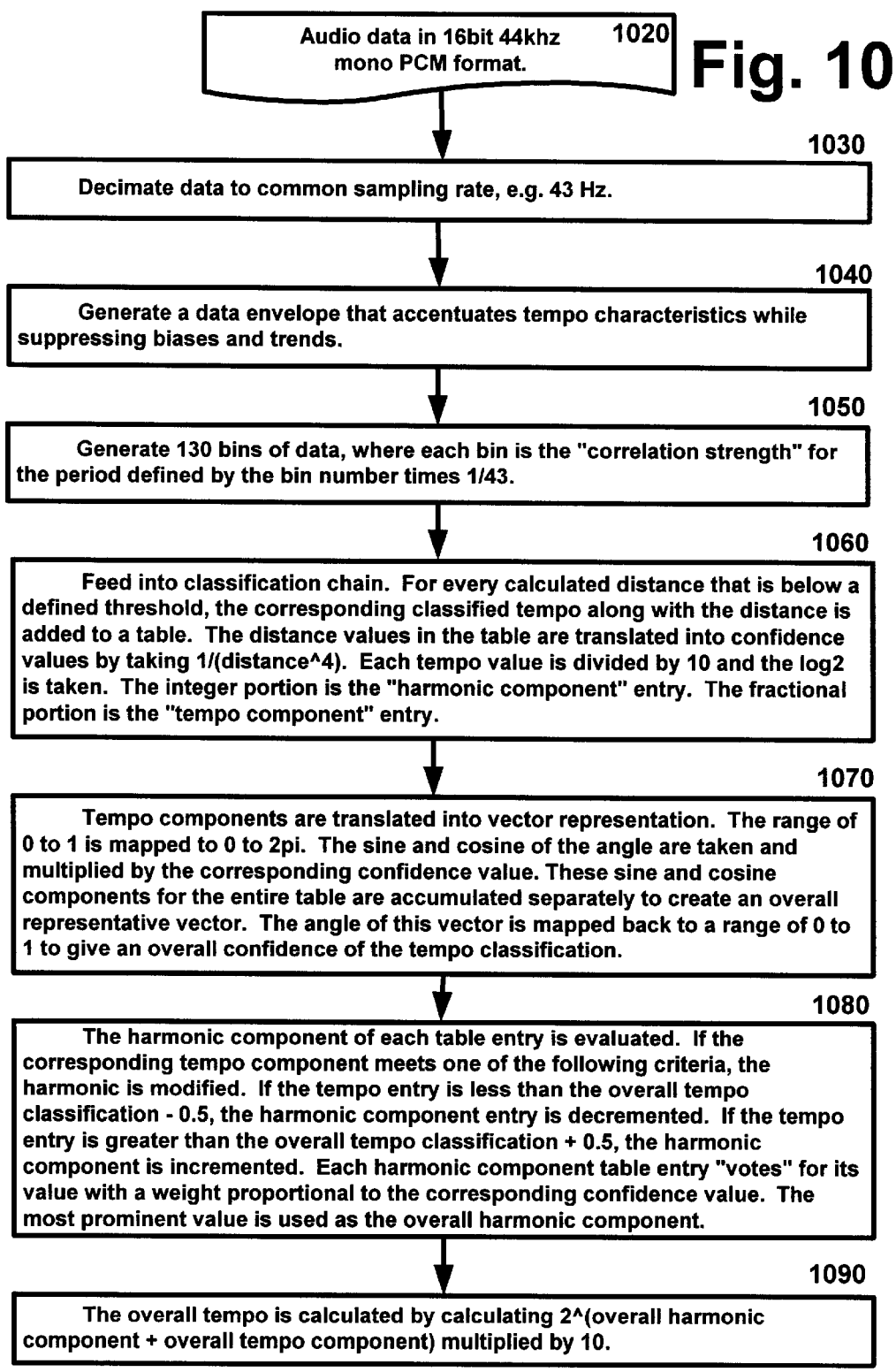
FIG. 10 illustrates an exemplary process for extracting tempo properties from a media entity in accordance with the present invention.

The tempo calculations may be described in more detail with reference to FIG. 10 illustrating an exemplary non-limiting flow diagram that one of ordinary skill in the art might implement in choosing among many different realizations of tempo calculation in accordance with the present invention. At 1020, audio data is received in 16 bit 44 kHz mono PCM format. Various other formats may be accommodated as well. At 1030, the audio data is decimated, sub-sampled and/or averaged to a 43 Hz sampling rate by collapsing 1024 samples into 1 sample. As mentioned, this may be done by taking the square root of the sum of the squares of blocks of 1024 samples. At 1040, the data is processed to generate an envelope of data that accentuates tempo characteristics while suppressing biases and/or trends. This may be done by taking the first order difference, then half wave rectifying, then applying a median filter, then subtracting the mean value, again half wave rectifying, then taking the first order difference and once again half wave rectifying. At 1050, 130 bins of data are generated, with each bin being defined as the "correlation strength" for the period defined by the bin number times $1/43$. For example, bin number 43 corresponds to a period of 1 second or 60 beats per minute. The calculation is similar to an autocorrelation function, except, inter alia, that the log base 2 of the product of the data is accumulated.

At 1060, the data may be fed into the classification chain. Then, for every calculated distance that is below a defined threshold, the corresponding classified tempo along with the distance is added to a table. In an exemplary implementation, the distance values in the table are translated into confidence values by taking $1/(distance^4)$. Each tempo value is divided by ten and the log base 2 of the result is taken. The integer portion is the "harmonic component" entry and the fractional portion is the "tempo component" entry. At 1070, the tempo components are translated into vector representation. The range from 0 to 1 is mapped to the range from 0 to $2\pi$. The sine and cosine of the angles are taken and multiplied by the corresponding confidence value. These sine and cosine components for the entire table may be accumulated separately to create an overall representative vector. The angle of this vector is mapped back to a range from 0 to 1 to give an overall confidence of the tempo classification. At 1080, the harmonic component of each table entry is evaluated. If the corresponding tempo component meets one of the following criteria, the harmonic component is modified. If the tempo entry is less than the overall tempo classification minus 0.5, the harmonic component entry is decremented. If the tempo entry is greater than the overall tempo classification plus 0.5, the harmonic component is incremented. Each harmonic component table entry "votes" for its value with a weight proportional to the corresponding confidence value. The most prominent value is used as the overall harmonic component. At 1090, the overall tempo is calculated by evaluating the expression: 10 times 2^(overall harmonic component plus overall tempo component).

In addition to the advantage of merging perceptual or human classified tempo properties with the DSP tempo properties of media entities, the above-described methods of tempo classification are significantly faster than the techniques utilized in the prior art. Using a classification chain built from at least 100,000 songs, for example, the accuracy is comparable or better. The method also returns a confidence factor, which flags input data that cannot be classified reliably. The same classification chain can simultaneously be used to determine other parameters, such as time signature and any other property described above. Other advantages inherent in the use of a classification chain in accordance with the present invention are described in more detail above.

The media entities contemplated by the present invention in all of its various embodiments are not limited to music or songs, but rather the invention applies to any media to which a classification technique may be applied that merges perceptual (human) analysis with acoustic (DSP) analysis for increased accuracy in classification and matching. While various embodiments of the present invention have been described in connection with sonic, consonance, tempo, melodic movement properties of media entities, it is to be understood that any combination or permutation thereof is considered when classifying a media entity for a set of properties for a classification chain, and that additional properties may be adapted to the classification chain as well. For example, by performing automatic DSP processing of a media entity for a property to be adapted, wherein human experts have previously classified the corresponding perceptual characteristic(s) suited to the property, and then forming a vector for inclusion in the classification chain, an initial classification for the adapted property may be formed. Then, as new unclassified media entities are included in the system, the classification chain can be "tweaked," as described above, to improve the number of successful responses when classifying new, unclassified music for that adapted property.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of music data, one skilled in the art will recognize that the present invention is not limited to the music, and that the methods of tailoring media to a user, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for automatically classifying tempo properties of audio data, comprising:
   reducing input audio data to a lower resolution;
   applying an accentuation process to the input audio data to accentuate the tempo properties of the data and applying a smoothing process to smooth at least one of an aberration, bias and trend of the tempo properties of the input audio data;
   generating a plurality of bins of data that correspond to at least one tempo property of the input audio data; and
   generating a tempo property feature vector from said at least one tempo property.

2. A method according to claim 1, wherein said reducing includes decimating the input audio data to a fixed sampling rate.

3. A method according to claim 2, wherein said reducing includes decimating the input audio data to approximately a 43 Hz sampling rate.

4. A method according to claim 1, wherein said applying of the smoothing process includes applying a median filter to smooth said at least one of an aberration, bias and trend of the tempo properties of the input audio data.

5. A method according to claim 1, wherein said applying of the accentuation process and smoothing process includes first performing of a first order difference calculation followed by performing a first half wave rectification.

6. A method according to claim 5, wherein said applying of the accentuation process and smoothing process includes subtracting a mean value of the audio data followed by performing a second half wave rectification.

7. A method according to claim 6, wherein said applying of the accentuation process and smoothing process includes second of performing a second first order difference calculation followed by performing a third half wave rectification to generate said at least one tempo property.

8. A method according to claim 1, wherein said generating a plurality of bins of data that correspond to at least one tempo property of the input audio data includes generating a plurality of bins reflective of the different correlation strengths at different time periods or frequencies.

9. A method according to claim 8, wherein said generating a plurality of bins of data that correspond to at least one tempo property of the input audio data includes generating 130 bins.

10. A method according to claim 1, wherein said generating a plurality of bins of data that correspond to at least one tempo property of the input audio data includes looping through the audio data and accumulating the base two logarithm of the product of pairs of points located at a fixed offset from each other.

11. A method according to claim 10, wherein said looping is performed 130 times for offsets spanning from 1 to 130 samples resulting in said bins of data.

12. A method according to claim 10, wherein said tempo property feature vector includes said plurality of bins of data, and further comprising inputting said tempo property feature vector to a classification chain.

13. A method according to claim 1, further comprising applying the tempo property feature vector to a classification stage which determines at least one of (1) at least one tempo properties value and (2) at least one tempo properties class that describes the audio data.

14. A method according to claim 1, wherein the audio data is formatted according to pulse code modulated format.

15. A method according to claim 14, wherein the audio data is previously in a format other than pulse code modulated format, and the method further comprises converting the audio data to pulse code modulated format from the other format.

16. A computer readable medium bearing computer executable instructions for carrying out the method of claim 1.

17. A modulated data signal carrying computer executable instructions for performing the method of claim 1.

18. At least one computing device comprising means for performing the method of claim 1.

19. A method of classifying data according to tempo properties of the data, comprising:
   assigning to each media entity of a plurality of media entities in a data set to at least one tempo properties class;
   processing each media entity of said data set to extract at least one tempo properties characteristic based on digital signal processing of each media entity;
   generating pluralities of tempo properties bins of data for said plurality of media entities, wherein each plurality of tempo properties bins includes said at least one tempo properties class and at least one tempo properties characteristic based on digital signal processing; and
   forming a classification chain based upon said pluralities of tempo properties bins of data.

20. A method according to claim 19, further comprising:
   processing an unclassified media entity to extract at least one tempo properties characteristic based on digital signal processing of the unclassified media entity;
   presenting said at least one digital signal processing tempo properties characteristic for the unclassified media entity to the classification chain;
   calculating an estimate of the tempo properties class via a comparison process between said at least one digital signal processing tempo properties characteristic and the classification chain; and
   classifying the unclassified entry with the estimate of the tempo properties class.

21. A method according to claim 20, wherein said processing includes cycling through each of the points in the classification chain and generating a table of distance values and tempo values.

22. A method according to claim 21, wherein cycling through a point in the classification chain includes computing a plurality of distances, with each distance being computed between a dimension represented by the at least one digital signal processing tempo properties characteristic and a dimension represented by a point in the classification chain, and taking the square root of the result of summing the squares of the plurality of distances, to produce a distance for the point.

23. A method according to claim 22, wherein if said distance for the point is less than a threshold value, the distance for the point and the tempo value associated with the point is added to the table.

24. A method according to claim 21, wherein confidence values for the distance values in the table are calculated in proportion to the distance values, respectively.

25. A method according to claim 24, wherein a confidence value for a distance value is computed in exponential proportion to the distance value.

26. A method according to claim 24, wherein a tempo component and a harmonic component is computed for each of said tempo values in the table.

27. A method according to claim 26, wherein for each of said tempo values, the log base two of the tempo value divided by 10 is performed, and the integer portion of the result is the harmonic component and the fractional portion of the result is the tempo component.

28. A method according to claim 26, further including an averaging process wherein said tempo components are averaged to generate an intermediate estimated tempo class.

29. A method according to claim 28, wherein calculating the intermediate estimated tempo class includes mapping the tempo components to angular representations between 0 and $2\pi$, calculating the sine and cosine of the angular representations and multiplying the sine values and cosine values by the corresponding confidence values, calculating the inverse tangent of the division of the sum of the multiplied sine values by the sum of the multiplied cosine values and mapping the resulting angle to a value between zero and one.

30. A method according to claim 28, further including generating a harmonic component estimate of the unclassified media entity based on the intermediate estimated tempo class.

31. A method according to claim 30, wherein said estimated tempo class of the unclassified media entity is calculated based on said harmonic component estimate and said intermediate estimated tempo class.

32. A method according to claim 20, wherein said classifying of the unclassified entry with the estimate of the tempo properties class includes returning at least one number indicating an overall confidence of the estimate of the tempo properties class.

33. A computer readable medium bearing computer executable instructions for carrying out the method of claim 19.

34. A modulated data signal carrying computer executable instructions for performing the method of claim 19.

35. At least one computing device comprising means for performing the method of claim 19.

* * * * *

UNITED STATES PATENT AND TRADEMARK OFFICE
CERTIFICATE OF CORRECTION

PATENT NO.   : 6,657,117 B2
DATED        : December 2, 2003
INVENTOR(S)  : Christopher B. Weare and Marc Daskalovic It is certified that error appears in the above-identified patent and that said Letters Patent is hereby corrected as shown below:

Column 1,
Line 15, delete the second occurrence of "July 31, 2001" and insert
-- July 13, 2001 -- therefor.

Column 4,
Line 2, delete "SOFM" and insert -- SOFM's therefor;

Column 10,
Line 9, delete "[Attorney Docket No. MSFT-0581]" and insert -- 09/934,774 -- therefor;

Column 11,
Line 57, delete "d" and insert -- d1 -- therefor;

Column 18,
Line 14, delete "outputs" amd insert -- output -- therefor;

Column 23,
Line 14, insert -- a -- before "variety".

Signed and Sealed this

Fourth Day of May, 2004

JON W. DUDAS
*Acting Director of the United States Patent and Trademark Office*